US009672431B2

(12) United States Patent
Fernandez et al.

(10) Patent No.: US 9,672,431 B2
(45) Date of Patent: *Jun. 6, 2017

(54) OBJECT DETECTION

(71) Applicant: ANALOG DEVICES GLOBAL, Hamilton (BM)

(72) Inventors: Joseph Fernandez, Karnataka (IN); Sreenath Kottekkode, Karnataka (IN)

(73) Assignee: ANALOG DEVICES GLOBAL, Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/097,223

(22) Filed: Dec. 4, 2013

(65) Prior Publication Data

US 2016/0224847 A1 Aug. 4, 2016

Related U.S. Application Data

(63) Continuation-in-part of application No. 13/888,993, filed on May 7, 2013.

(Continued)

(51) Int. Cl.
*G06K 9/00* (2006.01)
*G06K 9/46* (2006.01)
(Continued)

(52) U.S. Cl.
CPC ..... *G06K 9/00805* (2013.01); *G06K 9/00791* (2013.01); *G06K 9/4642* (2013.01); *G06K 9/6212* (2013.01); *G06K 9/6218* (2013.01); *G06K 9/6269* (2013.01); *G06T 7/13* (2017.01); *G08G 1/16* (2013.01);
(Continued)

(58) Field of Classification Search
None
See application file for complete search history.

(56) References Cited

U.S. PATENT DOCUMENTS 6,327,536 B1 * 12/2001 Tsuji et al. ............ 701/301
7,561,720 B2 * 7/2009 Miyahara ............ G06T 7/0044
348/140

(Continued)

OTHER PUBLICATIONS

Kanitkar et al., "Vision based Preceding Vehicle Detection Using Self Shadows and Structural Edge Features", Image Information Processing (ICIIP), 2011 International Conference, pp. 1-6, Nov. 3-5, 2011.*

(Continued)

*Primary Examiner* — Matthew Bella
*Assistant Examiner* — Jose M Torres
(74) *Attorney, Agent, or Firm* — Patent Capital Group

(57) ABSTRACT

In an example detection system for vehicles or other objects of interest, objects are detected in real-time at full VGA 30 frame per second resolution. A preprocessor may perform run-length encoding (RLE) to provide detected edges. The image may then be scanned from the bottom up to identify vertical clusters or "stacks" or RLEs. Vertical clusters with low vertical density may be eliminated as poor vehicle candidates. Vertical clusters not eliminated may then be processed with a histogram of gradients algorithm, and confirmed with a support vector machine algorithm. A range to the nearest object may also be calculated, and a warning provided if the object is too close.

18 Claims, 21 Drawing Sheets

Related U.S. Application Data

(60) Provisional application No. 61/724,867, filed on Nov. 9, 2012, provisional application No. 61/810,047, filed on Apr. 9, 2013.

(51) Int. Cl.
  *G06K 9/66* (2006.01)
  *G06K 9/62* (2006.01)
  *G08G 1/16* (2006.01)
  *G06T 7/13* (2017.01)
  *H04N 7/18* (2006.01)

(52) U.S. Cl.
  CPC .............. *G06T 2207/10016* (2013.01); *G06T 2207/20072* (2013.01); *G06T 2207/30261* (2013.01)

(56) References Cited

U.S. PATENT DOCUMENTS

| | | | |
|---|---|---|---|
| 7,570,198 B2 * | 8/2009 | Tokoro | G01S 7/4004 342/70 |
| 7,620,208 B2 | 11/2009 | Zhu et al. | |
| 7,639,841 B2 | 12/2009 | Zhu et al. | |
| 8,379,928 B2 | 2/2013 | Kuoch et al. | |
| 8,649,594 B1 | 2/2014 | Hua et al. | |
| 9,460,354 B2 | 10/2016 | Fernandez et al. | |
| 2005/0002570 A1 | 1/2005 | Clark et al. | |
| 2005/0100192 A1 | 5/2005 | Fujimura et al. | |
| 2006/0177099 A1 * | 8/2006 | Zhu | G06K 9/00335 382/104 |
| 2006/0177100 A1 | 8/2006 | Zhu et al. | |
| 2006/0245653 A1 * | 11/2006 | Camus et al. | 382/199 |
| 2007/0043491 A1 * | 2/2007 | Goerick et al. | 701/41 |
| 2009/0067675 A1 * | 3/2009 | Tan | G06K 9/00798 382/104 |
| 2011/0249867 A1 | 10/2011 | Haas et al. | |
| 2012/0039508 A1 | 2/2012 | Cao et al. | |
| 2012/0140076 A1 | 6/2012 | Rosenbaum et al. | |
| 2012/0313523 A1 | 12/2012 | Futamura et al. | |
| 2013/0103299 A1 * | 4/2013 | Matsuda | G06F 17/00 701/300 |
| 2014/0133698 A1 | 5/2014 | Fernandez et al. | |

OTHER PUBLICATIONS

Dalal et al., "Histograms of Oriented Gradients for Human Detection", IEEE Computer Society Conference on Computer Vision and Patter Recognition, 2005, vol. 1, pp. 886-893.*

Southall et al., "Real-time Vehicle Detection for Highway Driving", IEEE Conference on Computer Vision and Pattern Recognition, 2009, pp. 541-548.*

Wen et al., "A Rear-Vehicle Detection System for Static Images Based on Monocular Vision", 9th International Conference on Control, Automation, Robotics and Vision, 2006, pp. 1-4.*

Sun et al., "On-road vehicle detection using evolutionary Gabor filter optimization", IEEE Transactions on Intelligent Transportation Systems, vol. 6 Issue 2, Jun. 2005, pp. 125-137.*

U.S. Appl. No. 13/888,993, filed May 7, 2013, 32 pages.

Restriction Requirement issued in U.S. Appl. No. 13/888,993 mailed Apr. 8, 2015, 6 pages.

Non-Final Office Action issued in U.S. Appl. No. 13/888,993 mailed Jun. 30, 2015, 33 pages.

Kyrkou et al., "A Hardware Architecture for Real-Time Object Detection Using Depth and Edge Information", KIOS Research Center, Department of Electrical and Computer Engineering, University of Cyrpus, © 2011, ACM 1073-0516/01/0300-0034, 25 pages.

Messom et al., "Hough Transform Run Length Encoding for Real-Time Image Processing", IEEE Transactions on Instrumentation and Measurement, vol. 56, No. 3, Jun. 2007, pp. 962-967, 6 pages.

Seo et al., "Face Pose Estimation System by Combining Hybrid ICA-SVM Learning and 3D Modeling", Sogang University, Department of Media Technology, Seoul, Korea, © 2001, 6 pages.

Final Office Action issued in U.S. Appl. No. 14/888,993 mailed Dec. 18, 2015, 9 pages.

KR Office Action (Preliminary Rejection) issued in KR Patent Application Serial No. 10-2013-0135336 mailed Sep. 24, 2015.

English Summary of KR Office Action (Preliminary Rejection) issued in KR Patent Application Serial No. 10-2013-0135336 mailed Sep. 24, 2015, 5 pages.

Response to KR Office Action (Preliminary Amendment) in KR Patent Application Serial No. 10-2013-0135336 filed Nov. 24, 2015.

Notice of Allowance issued in U.S. Appl. No. 14/888,993 mailed May 26, 2016, 13 pages.

KR Office Action (Last Preliminary Rejection) issued in KR Patent Application Serial No. 10-2013-0135336 mailed Mar. 22, 2016, 3 pages.

English Summary of KR Office Action (Last Preliminary Rejection) issued in KR Patent Application Serial No. 10-2013-0135336 mailed Mar. 22, 2016, 1 page.

DE Office Action issued in DE Patent Application Serial No. 102013112163.2 mailed Sep. 29, 2016, 5 pages.

English Summary of DE Office Action issued in DE Patent Application Serial No. 102013112163.2 mailed Sep. 29, 2016, 5 pages.

Notice of Allowance issued in KR Patent Application Serial No. 10-2013-0135336 mailed Aug. 18, 2016, 2 pages.

English Translation of Allowed Claims to the Notice of Allowance issued in KR Patent Application Serial No. 10-2013-0135336 mailed Aug. 18, 2016, 5 pages.

* cited by examiner

OBJECT DETECTION

PRIORITY DATA

This application is a continuation-in-part of U.S. nonprovisional application Ser. No. 13/888,993, entitled "Object Detection," filed May 7, 2013, which is a nonprovisional of U.S. Provisional Patent Application Ser. No. 61/724,867, filed Nov. 9, 2012 and U.S. Provisional Patent Application Ser. No. 61/810,047, filed Apr. 9, 2013, all of which are hereby incorporated by reference in their entirety.

TECHNICAL FIELD OF THE DISCLOSURE

The present disclosure relates generally to object detection and more particularly to detection of motor vehicles in a video stream for forward collision warning (FCW) systems.

BACKGROUND

Modern vehicles may include advanced driver assistance systems (ADAS). The role of an ADAS may range from merely passively warning a driver of dangers to assuming control of the vehicle in emergency situations to assuming complete autonomous control over the vehicle in desired situations. An ADAS may be a dedicated embedded microcomputer and may provide certain real-time operations, including for example Lane Departure Warning (LDW), Traffic Signal Recognition (TSR), Pedestrian Detection (PD), automated High Beam/Low Beam (HBLB) control, and FCW.

With particular reference to object detection for FCW, it is known in the art to use a histogram of gradients and a support vector machine (SVM) classifier to identify an object such as a car. Histogram of gradients and SVM are highly-reliable, but are also relatively computationally-intensive tasks.

OVERVIEW

Figure 1:
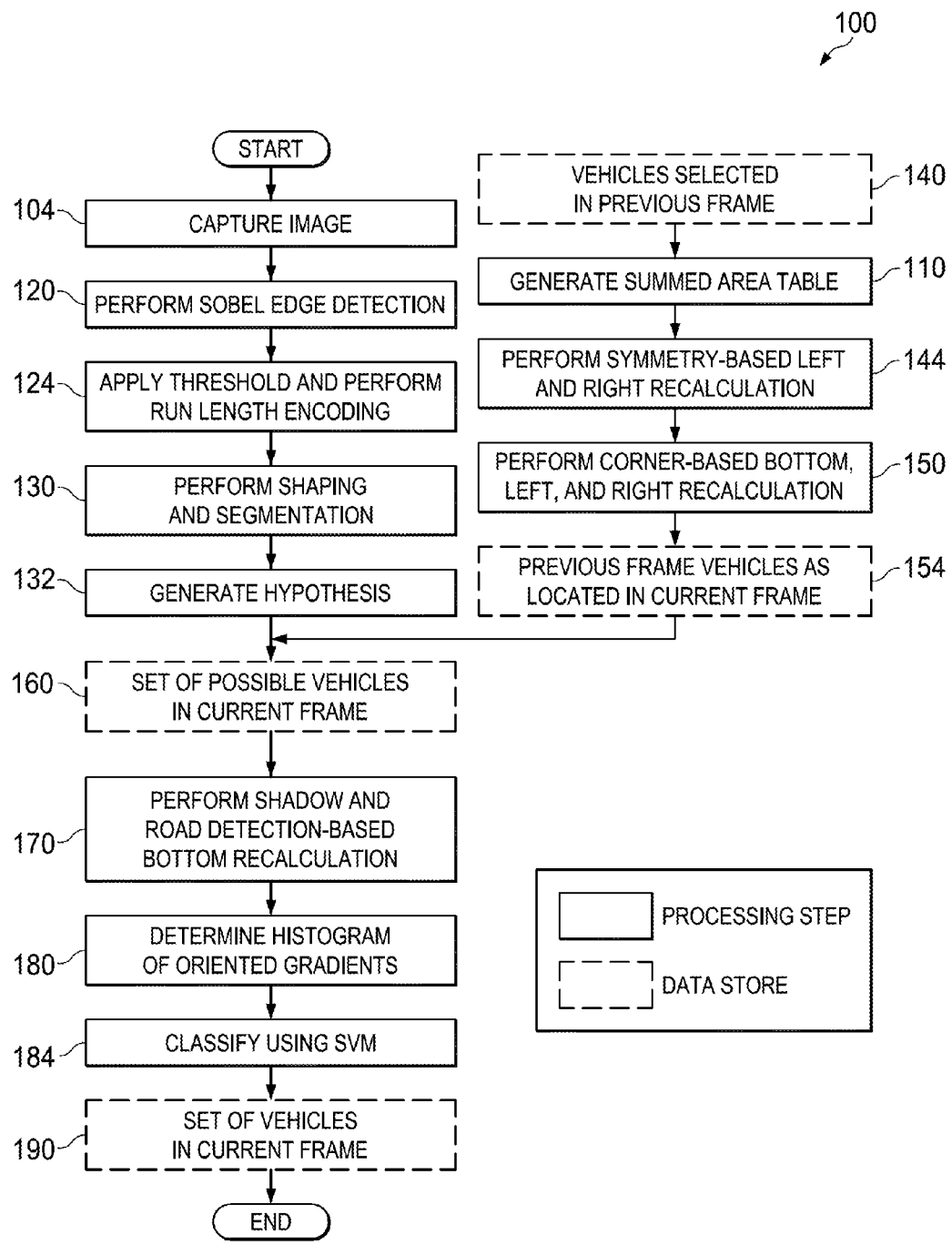
FIG. 1 is a flow chart of an example method of object detection.

In on example, there is disclosed a method of detecting an object of interest in an image comprising receiving the image; performing edge detection on the image; performing run-length encoding (RLE) on detected edges to identify edges for a shape bounding a candidate object; generating a hypothesis that the candidate object is the object of interest; and confirming that the candidate object is the object of interest.

In another example, there is disclosed a tangible computer-readable storage medium having stored thereon executable instructions operable to receive an image; perform edge detection on the image; perform run-length encoding (RLE) on detected edges to identify edges for a shape bounding a candidate object; generate a hypothesis that the candidate object is an object of interest; and confirm that the candidate object is the object of interest.

In yet another example, there is disclosed An advanced driver assistance system (ADAS) comprising a camera; a processor; and a storage medium having stored thereon executable instructions operable to instruct the processor to receive an image from the camera; perform edge detection on the image; perform run-length encoding (RLE) on detected edges to identify edges for a shape bounding a candidate object; generate a hypothesis that the candidate object is an object of interest; and confirm that the candidate object is the object of interest.

DESCRIPTION OF THE DISCLOSURE

While drawn generally to automated object detection by a computer, the present specification is best understood in relation to a concrete embodiment disclosed herein and shown in the FIGURES, relating particularly to FCW. The embodiment disclosed herein is adapted to provide real-time FCW at full video graphics array (VGA) resolution of 640×480 pixels and 30 frames per second (fps) while consuming no more than 250 millions of instructions per second (MIPS) on a digital signal processor (DSP), microprocessor, microcontroller, or similar. This permits real-time full-scale VGA detection on a single dual-core DSP such as the Analog Devices, Inc. (ADI) "Blackfin" BF609 dual-core processor running at approximately 500 MHz. This DSP includes a pipelined vision processor, which is a set of functional hardware blocks next to the DSP cores designed to perform basic image processing.

The FCW method of the example embodiment is two-pronged: one prong based on a Sobel edge map and subsequent run length encoding (RLE) analysis, and the second path based on summed area table (SAT) analysis. It should be noted that although Sobel edge detection and run length encoding are described herein with reference to specific algorithms, those algorithms are disclosed by way of non-limiting example only, and it is not intended to limit the specification to those specific algorithms. On the contrary, this specification is broadly intended to encompass any suitable edge detection and run-length algorithms.

In the example embodiment, the two paths (the RLE based path and the SAT based path) are independent of one another. The independent pathways ensure that if the edge map is adversely affected (for example, resulting from shadows or other environmental conditions), such that the RLE based path is affected, the SAT based path can still provide reliable detection.

In the example embodiment, VGA FCW processing is performed on average at about 110 MIPS with a peak of about 249 MIPS. In an example, the RLE based pathway (for example, the RLE based hypothesis generation) can additionally be used to detect vehicle lights, for example, for automatic headlamp control.

In contrast to conventional vehicle detection methods, the disclosed detection method employs symmetry, corner, and shadow detection discretely and optimally. For example, simple Haar features are implemented to achieve corner detection, thereby reducing MIPS. Further, the symmetry, corner, and shadow detection features are performed on vehicle(s) in the previous image frame, instead of possible vehicle(s) in the current frame, thereby providing deterministic MIPS.

The disclosed vehicle detection method refrains from using all detection features at all stages, instead implementing a discretional cascade of relevant detection features. For example, the disclosed vehicle detection method uses:

a. symmetry to detect left side and right side of the vehicle;
 b. corner to recalculate bottom, left, and right sides of the vehicle;
 c. shadow and road intensities to recalculate the bottom side of the vehicle and
 d. segments derived from an RLE of an edge map to readjust the top side of the vehicle.

In another example embodiment of the present specification, detection rate may be improved, together with a reduction in false positives, by a "bottom-up" method for detecting candidate objects. In this example, an image is scanned from the bottom progressively upward. When "stacks" or vertical clusters of horizontal edges, which are characteristic of automobiles, are found, they may be identified as "candidate" objects, and marked for further processing and verification. In one example, detection of vertical clusters of horizontal edges may completely replace symmetry, corner, shadow, and segment calculation. In another example, vertical cluster detection may supplement those methods.

Turning now to the included FIGURES, an example embodiment of an object detection method and system is disclosed in more detail. In accordance with standard practices, various features are not drawn to scale and are used for illustration purposes only.

FIG. 1 is a flow diagram of an example method 100 of detecting one or more objects of interest, such as vehicles, in a frame of a video stream. By way of non-limiting example, the steps of this method are disclosed in a particular order and with reference to certain example hardware disclosed herein. It should be noted, however, that the order of steps in this method are not intended to be limiting, nor is it intended that the method be confined to the specific example hardware disclosed. It should also be noted that where a first step precedes a second step, or where a second step is taken in response to a first step, there need not be a direct, causal relationship between the two steps, and it is anticipated that in some embodiments, there may be intervening steps.

Vehicle detection is useful as a concrete example because a core task in FCW is detecting a "nearest" vehicle, which may represent a collision danger. For example, FIG. 6 discloses an image 600 of an example road scene, which may be taken, for example, from a video stream of an onboard-camera of an ADAS-equipped vehicle (not shown). Image 600 includes three cars, 610, 630, and 640, all on road 620. Vehicle 610 is closest to and is in the same lane 622 as the ADAS-equipped car, thus representing the most proximate collision danger. Car 640 is further away and is in a parallel lane, thus representing a lesser collision danger. Car 630 is approximately as close as car 610, but is in a parallel lane, and thus also represents a lesser collision danger. Complications in successfully identifying car 610 may include trees 660 and poles 650 appearing as false edges of car 610, and differentiating car 610 from road 620 and shadow 612. A successful FCW event may include detecting that car 610 is a car, separate from road 620, shadow 612, poles 650, and trees 660, and that car 610 is unsafely proximate. In response to the detection, the FCW system may take an appropriate action such as warning the driver or applying brakes.

As noted above, vehicle 610 can be detected relatively reliably with a histogram of gradients and SVM classification (HoG/SVM) method. But performing HoG/SVM on a full-VGA field of 640×480 pixels at 30 fps is prohibitively computationally-intensive, and thus may not be practicable on an embedded processor such as a Blackfin BF609, particularly when the processor is also required to perform LDW, TSR, PD, and HBLB in real time. Absent the method of FIG. 1, options for real-time processing on a DSP may include, for example, undersampling the image at 15 fps, or using a preprocessor to compress the resolution to 320×240 pixels. Such techniques, however, result in lower reliability. Another option is to use additional cores or processors, thus incurring penalties of additional cost or complexity, as well as the opportunity cost of additional benefits gained from adding cores or processors. For example, additional cores or processors may be used to enable real-time processing of high-definition images at 1280×920 pixels. Thus, FIG. 1 discloses a method 100 of object detection in which HoG/SVM is performed only on a selected subset of the pixels in an image, whereby fewer processor cycles are consumed by the FCW routine, enabling real-time detection at full-VGA resolution at 30 fps on a single dual-core processor, or real-time detection at 1280×960 resolution at 30 fps on a two-dual-core processor configuration—all in addition to reliable LDW, TSR, PD, and HBLB.

Returning to FIG. 1, according to method 100, an image is captured at block 104. In the example method, the captured image includes an object of interest to be detected, such as a nearest vehicle. In block 120, the prior art Sobel edge detection method is performed on the image. The Sobel operator calculates an approximation of the gradient of image intensity without respect to intensity, or in other words, the Sobel operator calculates at each point a vector representing the rate of change of intensity at that point, as well as the direction of the change. A sharper intensity gradient (or stated otherwise, a more abrupt change in brightness) is more likely to represent an edge. Similarly, a sharp vertical gradient is more likely to represent a horizontal edge, while a sharp horizontal gradient is more likely to represent a vertical edge.

Figure 7:
FIG. 7 is an example graphical view of a run-length encoding plot.

In block 124, the output of Sobel edge detection 120 is used to perform run-length encoding (RLE). RLE is a method wherein "runs" of similar or identical pixels are encoded as a run length and value. For example, in an example black and white image where "B" represents black and "W" represents white, 50 consecutive black pixels would be run-length encoded as "50B." In this method, the Sobel Edge Polar Magnitude is subjected to a threshold; values below the threshold are assigned to 0; those greater than the threshold are assigned to 1. Then run-lengths of 1 are encoded and used in the subsequent shaping stage. Those having skill in the art will recognize that variations of this method are also possible, for example, grouping pixels falling within a certain variance of one another, or repeating patterns of pixels (for example, 50 occurrences of the pattern "BBWW" may be encoded as "50BBWW"). The RLE operation may yield a high-contrast RLE plot such as RLE plot 700 (FIG. 7).

Figure 8:
FIG. 8 is an example of region creation on a run-length encoding plot.

In block 130, a process of shaping and segmentation is performed to further refine shapes defined in RLE plot 700. For example, FIG. 8 discloses three regions of interest (ROI) 810, 820, 830 identified from RLE plot 700 (FIG. 7), each being substantially rectangular. Object 810 is, in the example embodiment, an object that may be a forward collision danger. Thus, it is beneficial to more precisely refine the area bounding object 810. In some cases, shaping and segmentation may be minimal so as not to consume excessive processing power.

In block 132, a hypothesis is formed as to how many vehicles are in the present frame. In block 134, a set of possible vehicles in the current frame is provided.

Advantageously, where the disclosed vehicle detection method includes the RLE based pathway, the RLE of the image is inherently more reliable since unambiguous positions are available. However, RLE is often not used in real-time processing because it may be processor-intensive. As noted above, the present disclosure implements the disclosed vehicle detection method in a DSP, such as the Blackfin 609 DSP by Analog Devices, Inc., which enables offloading the RLE generation to a PVP video preprocessor.

In a separate branch of FIG. 1, in block 110, a summed area table (SAT) is produced for a prior image, for example an image that was processed according to the block 120 branch in a previous iteration. The methods in the block 110 branch are provided to refine the hypothesis. The SAT operation divides the image into a plurality of discrete squares, each of which is uniform in size in the example embodiment, and each of which has a characteristic intensity, which may be either the intensity of an individual pixel, or for blocks larger than one square pixel, may be a sum of intensities of the constituent pixels.

The SAT operation starts at the first block, and then proceeds across the entire image in an orderly fashion, recording for each block the sum of the intensity of that block and the value recorded for the previous block. Thus, the SAT records for each block the running sum of all intensities up to and including that block. The SAT is produced only once for each image, and greatly simplifies calculating sums for other operations. For example, a rectangular area bounded by sides (starting from the upper left and moving clockwise) A, B, C, D has an intensity sum of A+D−(B+C). Because intensity sums for A, B, C, and D are already recorded in the SAT, calculating the sum of an arbitrarily large rectangular area involves only three discrete operations.

Figure 9:
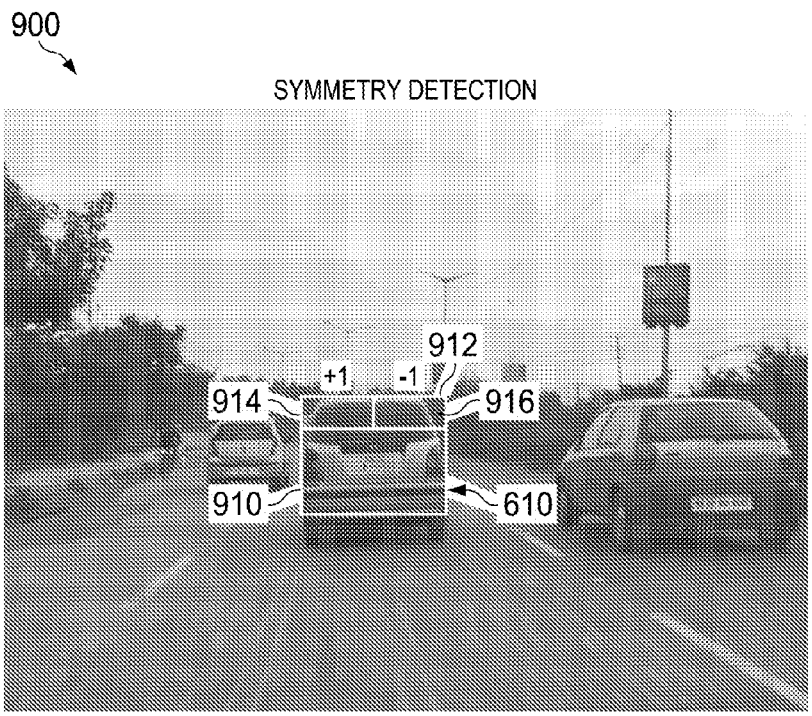
FIG. 9 is an example of symmetry processing on the image of FIG. 6.

In block 140, an image is provided, including vehicles or other candidate objects identified in a previous frame. In block 144, a symmetry check is performed to refine detection of left and right sides. This is useful for detecting vehicles because almost all motor vehicles are essentially symmetrical along a vertical axis when viewed from behind. Since all vehicles in the frame may not be viewed directly from behind, symmetry analysis may be accorded lesser priority than corner detection. An example of symmetry may be seen in FIG. 9, wherein object 610 has horizontally symmetrical regions 914 and 916, which are not vertically symmetrical with region 910. A corner 912 is also shown.

Figure 4:
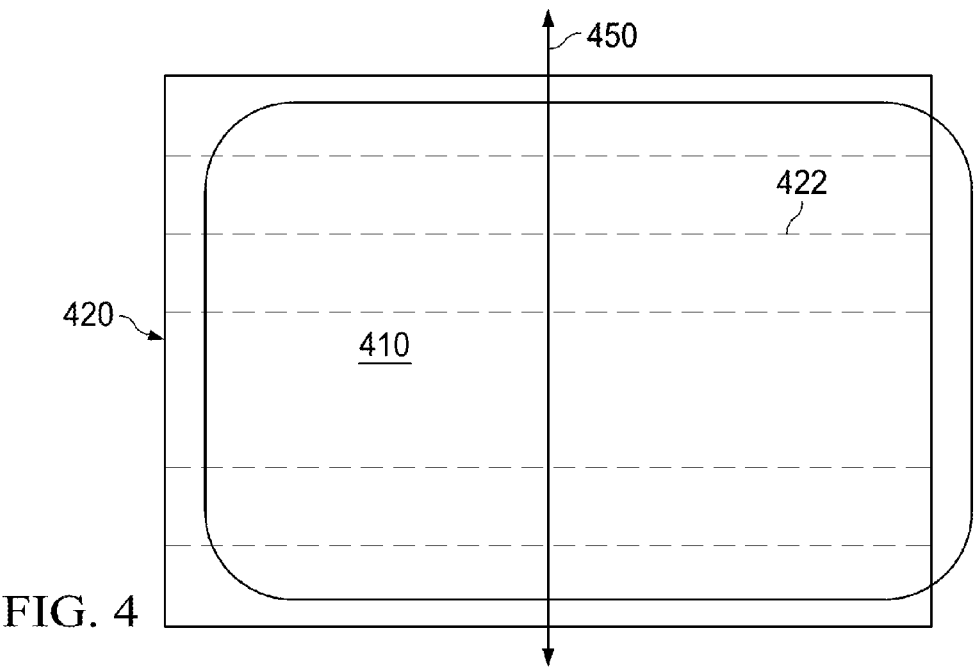
FIG. 4 is a block diagram view of a generalized symmetry method.

FIG. 4 discloses a generic version of an object undergoing the symmetry process of block 144. In FIG. 4, a candidate object of interest 410 has been identified. RLE processing from a previous stage has yielded an approximate shape 420, which in this example is slightly larger than object 410 and which is also off center. Shape 420 is divided into a plurality of segments 422. Segmentation is useful to avoid false positives for symmetry. For example, a feature in the lower left corner of object 410 may offset a feature in the upper right corner of object 410, thus creating a false vertical symmetry.

Figure 2:
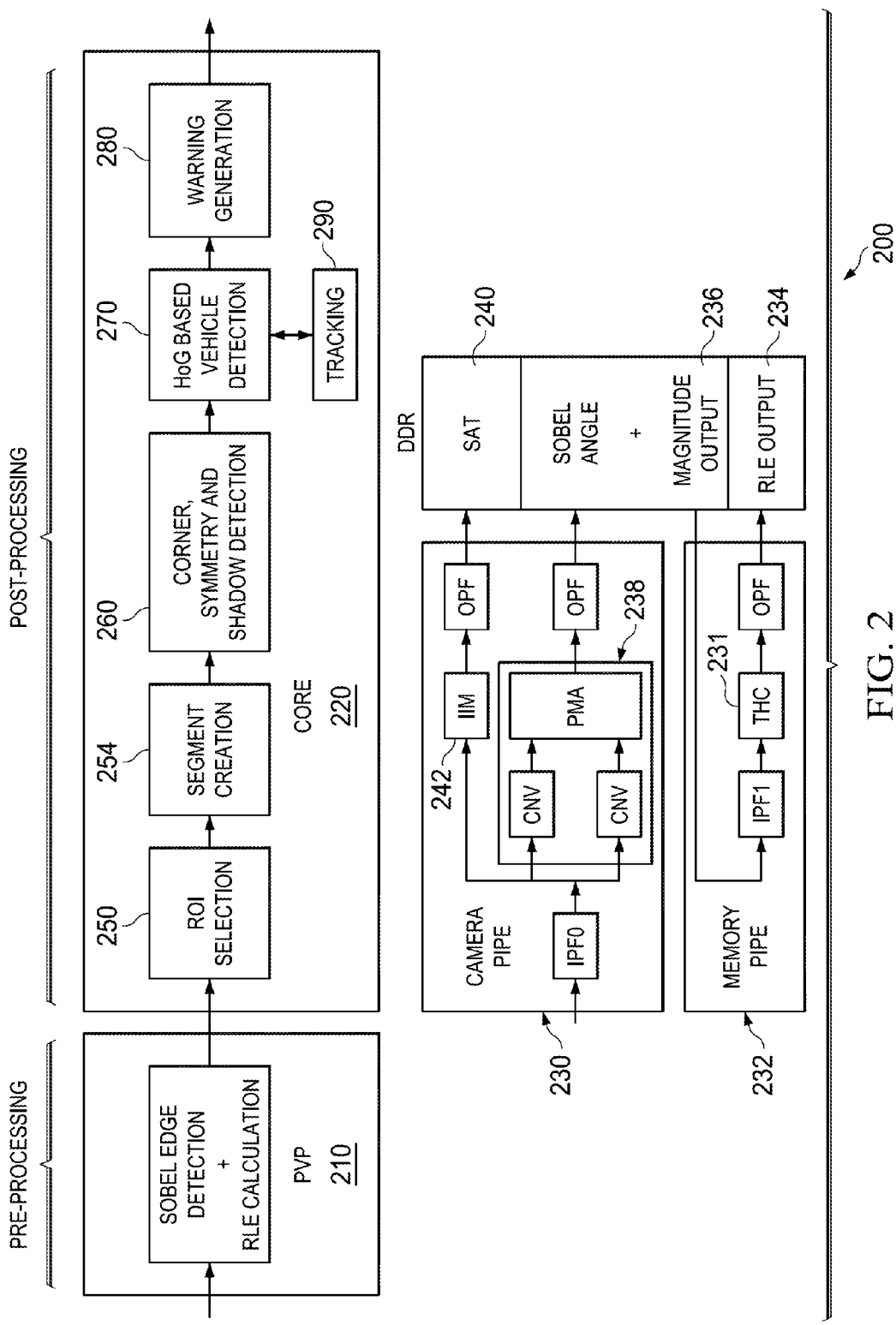
FIG. 2 is a functional block diagram of a generalized object detection computer.
Figure 4A:
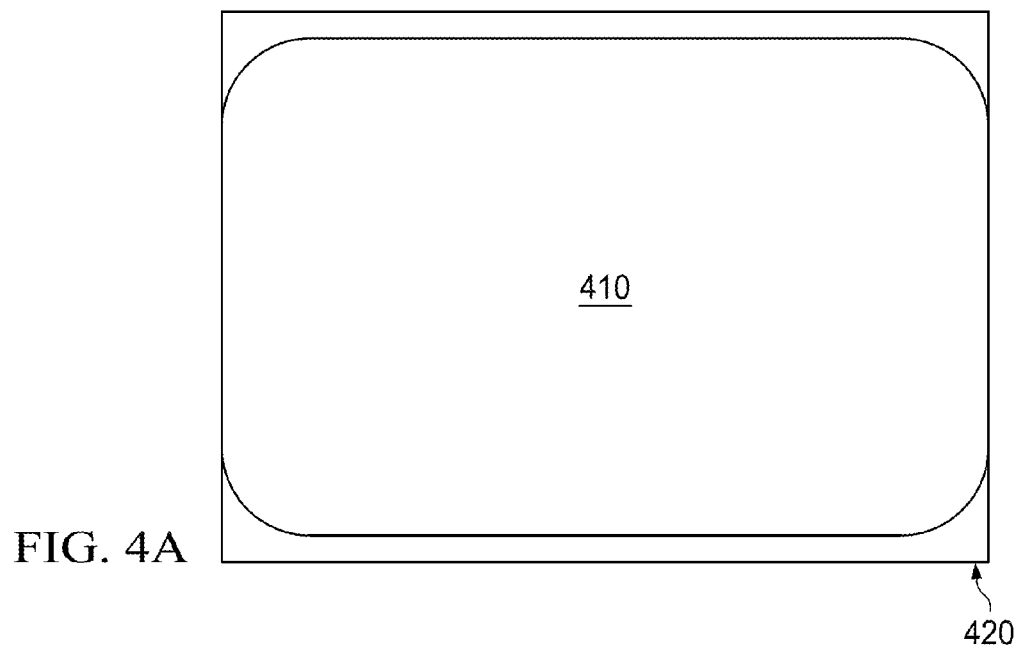
FIG. 4A is a block diagram of an object after a symmetry method.

After object 420 is divided into segments 422, a vertical axis 450 is established through the center of shape 420. Intensity sums are taken for both the left side (A) and the right side (B) of segment 422. A difference of these sums is then computed (A−B). The sum is not processor intensive because it is based on SAT 240 (FIG. 2). Shape 420 is then slid left and right, and contracted and expanded horizontally. With each change, additional differences of sums are taken. In an ideal image, the two sides of object 410 are exactly symmetrical, and the difference of the sums will be exactly zero when shape 420 is centered on object 410 and equal in width. In a practical application, shape 420 is centered on object 410 when the difference is at a minimum, as shown in FIG. 4A.

Figure 6:
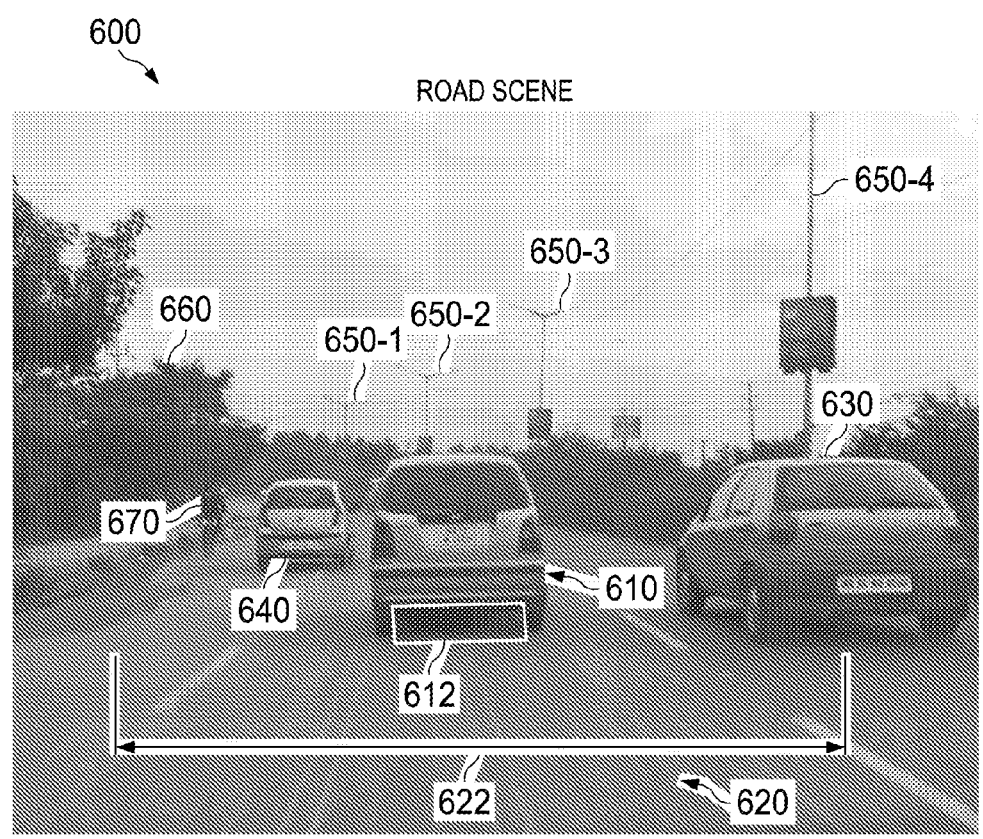
FIG. 6 is an example image taken from a video stream.
Figure 10:
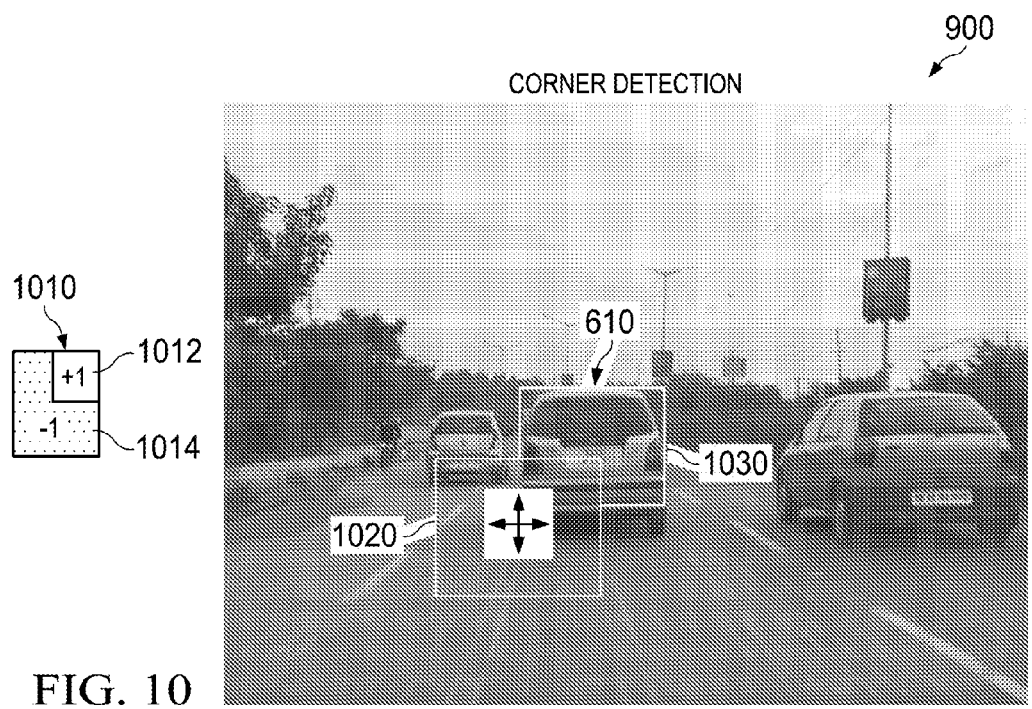
FIG. 10 is an example of corner detection on the image of FIG. 6.
Figure 11:
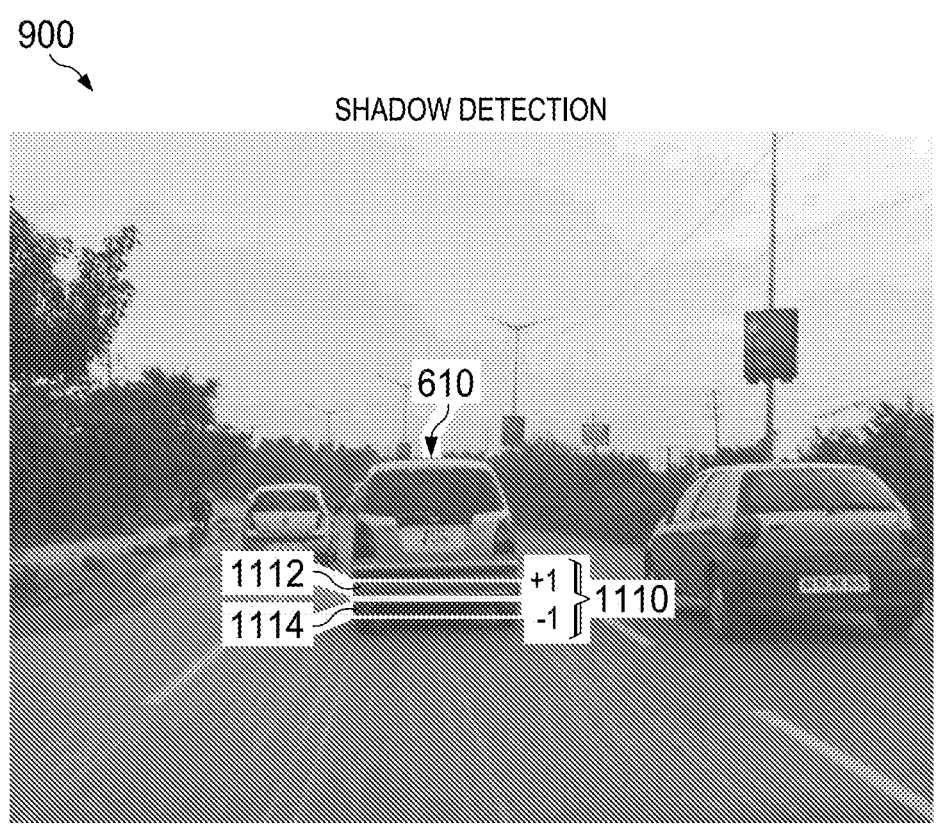
FIG. 11 is an example of shadow detection on the image of FIG. 6.

In block 150, a Haar template 1010 is used to refine detection of corners. Corner detection in useful because it increases confidence in both a vertical and a horizontal edge. Haar template 1010 is selected to have a shape roughly equivalent to a bottom-left corner shape and a size roughly proportional to the size of car 610 (FIG. 6). In FIG. 10, a Haar template 1010 is shown with an upper right quarter 1012 being +1 (white) and the remainder of the template 1014 being −1 (black). As with the symmetry method, intensity sums for 1012 (A) and 1014 (B) are calculated, and the difference (A−B) is computed. In some cases, a multiplier may also be used to scale intensities. The template is then moved around two-dimensionally near a bottom left corner of car 610. Differences of sums are calculated with each move, and when the difference is at a maximum, the corner has been detected. In some embodiments, the template may be inverted (−1 for 1012 and +1 for 1014) and additional processing steps may be added to corner detection to improve reliability. The operation is illustrated with template 1020 being moved over region 1030.

Figure 5:
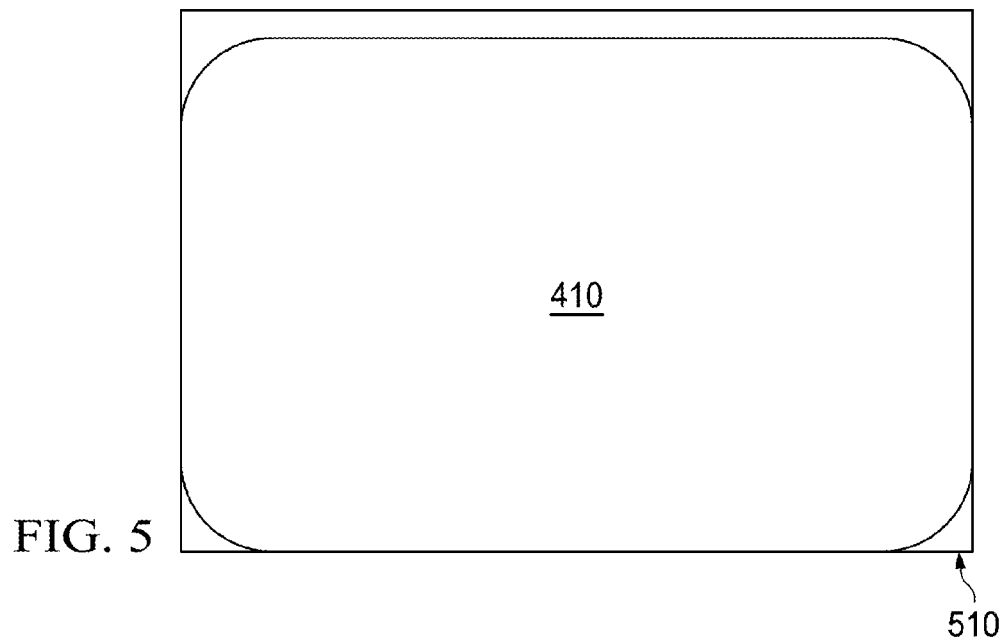
FIG. 5 is a block diagram of a generalized corner detection result.

FIG. 5 discloses a block diagram of an object 410, wherein bottom corners have been detected and a shape 510 is formed that closely matches the bottom corners of object 410. Note that shape 510 is a refinement of shape 420 (FIG. 4, 4A), which in the example embodiment was previously centered on object 410 using the symmetry method of FIG. 4. Also note that only bottom edges have been reliably detected. A similar Haar template can be used to reliably locate top edges where those are of interest. However, in some example road scenes, the bottom of a vehicle (being against the background of the road) may be more reliably detected than the top of the vehicle (which may be against the backdrop of things such as bill-boards, trees, poles, etc).

In the example embodiment where the task is to identify a vehicle that may be a forward collision danger, defining bottom edges is a priority because a known bottom edge, along with the focal length of the camera, can be used to reliably estimate the distance to the vehicle, thus determining whether the vehicle is close enough to be a collision danger or not. Refining top edge detection is not necessary for this task, and so processor cycles are not spent doing so.

In block 154, a refined image of a vehicle located in the current image is provided based on processing done on the previous frame. In block 160, the outputs of blocks 154 and 132 are combined to form a set of possible vehicles in the current frame.

In block 170, shadow and road detection are used to refine detection of the bottom of all possible vehicles in the current frame, including for example, cars 610, 630, and 640. Accurate detection of the bottoms of vehicles is important for accurately calculating a distance to the vehicles. In this method, a Haar template 1110 is provided. Haar template 1110 has a rectangular shape roughly equal to the shape of the bottom bumper of car 610 and shadow 612, and has two regions 1112 and 1114. Haar template may also be resized to fit the feature to be matched. In this example embodiment, region 1112 provides a multiplier of +1 (white), while region 1114 has a value of −1 (black). Thus, 1112 will more closely match shadow 612, while 1114 will more closely match road 620. Haar template 1110 is slid up and down and the difference between 1112 and 1114 is calculated. When that difference reaches a maximum value, meaning the greatest contrast, the bottom of car 610 has been detected more accurately. Notably, calculating of the differences is not processor intensive because the sums are all taken from the SAT of block 110.

In block 160, all candidate vehicles in the current frame, which in the example embodiment include cars 610, 630, and 640, are identified. In block 180, HoG is run on those candidates, and in block 184, the candidates are classified according to SVM. With those refinements, in block 190, vehicles in the current frame are identified. Vehicles identified in block 190 may then be provided to block 140 for SAT-based analyses during the next frame.

Blocks 144, 150, and 170 may generally be referred to as SAT-based analyses, and may be provided in a discretional cascade. Because the features provide redundancy and refinement to procedures performed in the block 120 branch, the operations of 144, 150, and 170 are not necessary to a good approximation of objects in an image. Certain of these steps may be eliminated in certain embodiments if accuracy is not at a premium.

FIG. 2 is a block diagram of functional aspects of an object detection system 200, including a processor carrying out the method of FIG. 1. In the example embodiment, a preprocessor such as pipeline vision processor (PVP) 210 is used for Sobel edge detection block 120, RLE block 124, and SAT block 110. A PVP 210 is provided on the example Blackfin BF609 DSP.

More specifically an Integral Image (IIM) block 242 calculates SAT 240. Two convolution (CNV) blocks combined with a Polar Magnitude Angle (PMA) block 238 compute Sobel edges 236. Sobel Edge 236 is provided to a Threshold, Histogram and Compression (THC) block 231, which calculates RLE plot 234.

Figure 12:
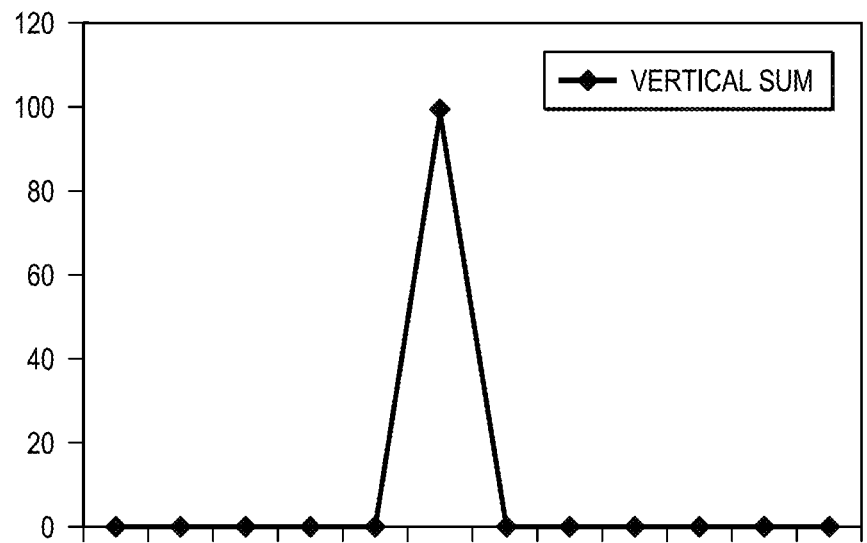
FIG. 12 is a plot of an example vertical sum.

For example, according to a method known in the prior art, edges are detected using vertical summing. Vertical sums are calculated for each column of pixels. The vertical sum is relatively low for columns of pixels where an edge is not represented and relatively high for a column of pixels where an edge is represented. In an ideal black-on-white image with a completely white field and an absolutely vertical black edge, the vertical sum function would have a characteristic of an impulse function, jumping from zero to a maximum value instantaneously, as shown in FIG. 12.

Figure 13:
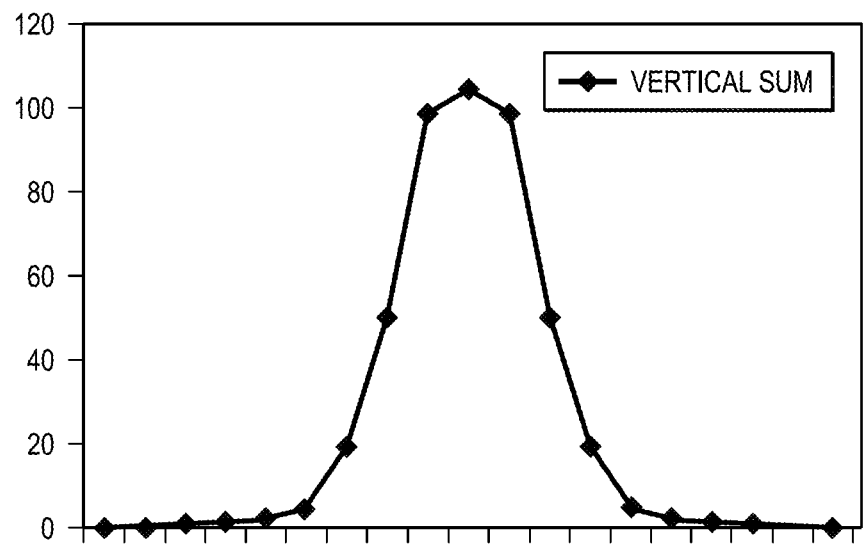
FIG. 13 is a plot of an example vertical sum.

In a real-world image with degrees of intensity and imperfect edges, the vertical sum will have an imperfect but characteristic "peak" or local maximum, with a steep rise and fall around the peak, as in FIG. 13.

Several such local maxima may appear, representing a plurality of vertical edges. For example, a vertical sum of FIG. 6 may show local maxima around the left and right edges of each of cars 610, 630, and 640.

Figure 14:
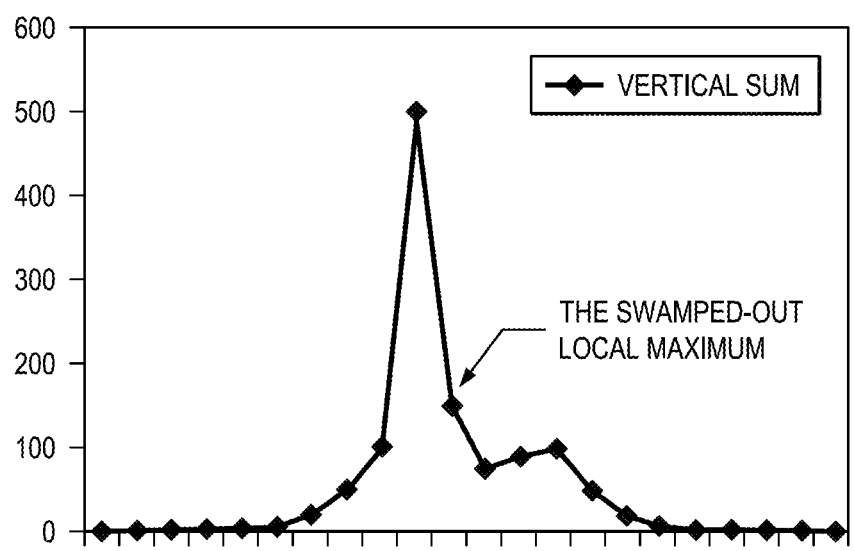
FIG. 14 is a plot of an example vertical sum.

A limitation to vertical summing is that it is susceptible to background disturbances. For example, in FIG. 6, pole 650-4 will form a very large local maximum, which may swamp out the local maximum for the left side of car 630, as seen in FIG. 14.

Because of this limitation, some embodiments of the present disclosure do not perform vertical summations, but rather rely on horizontal run lengths. In an ideal black-on-white image with perfectly-vertical edges one pixel wide, a vertical edge would be characterized by a "stack" of runs, each one-pixel wide and white, each at the exact same horizontal offset, and each with an infinitely steep gradient from white to black (or black to white) on either side. The stacks are limited by long runs of white pixels at the top and bottom, representing the top and bottom edges. Again, this idealized signature can be extrapolated to fit imperfect images, where the boundaries of a relatively rectangular object may be constructed as a "box," starting with a long run of relatively intense pixels (possibly several layers deep for an imperfect edge), and then stacks of relatively shorter runs of relatively intense pixels that partially overlap the top edge. The bottom of the box is found as a second long run of relatively intense pixels overlapping substantially with the first long run and overlapping in part with the vertical edge stacks.

In an example embodiment of the present disclosure, a box constructed from RLE forms a baseline hypothesis for identifying a candidate for an object of interest such as a vehicle.

Notably, returning to pole 650-4 of FIG. 6, sitting above car 630, an RLE box may be formed around pole 650-4, but the box around the pole will be characteristically and visibly distinct from a box around car 630. Because a long, narrow box around 650 will not fit the profile of a motor vehicle, that box may be discarded without additional processing. (Pole 650-4 also visibly includes a sign posted on it. Thus, pole 650-4 may in fact be divided into two long, narrow box and one additional box closer to square. This third box may more closely fit the profile of a vehicle, and thus may be a candidate for additional processing.)

To calculate run lengths on the image, PVP 210 first receives a camera pipe 230, which is a data feed from the camera. PVP 210 then performs a Sobel operation on the image, outputting vectors representing Sobel magnitudes and angles into Sobel output 236. Sobel output 236 is provided to a memory pipe 232, which PVP 210 passes to THC 231 to perform RLE on the image. The output of this function is an RLE plot 234, which is graphically represented as RLE plot 700 (FIG. 7). RLE plot 234 is provided to a processing core 220, which selects regions of interest (ROI), which in the example embodiment includes looking for box shapes in RLE plot 234.

PVP 210 provides SAT 240 and RLE Plot 234 to core 220. In block 250, core 220 selects regions of interest. In block 254, core 220 divides objects of interest into segments, as described in more detail for block 130 (FIG. 1). Core 220 then in block 260 performs corner, symmetry, and shadow detection operations on candidate objects in a prior iteration of the image using SAT 240. The operations of block 260 provide a set of candidate objects, which are provided to block 270, where HoG/SVM is performed on the candidate objects. Tracking is implemented in block 290 on all objects classified as vehicles for the current frame. If the candidate object is a potential collision danger, a warning may be generated in block 280.

Figure 3:
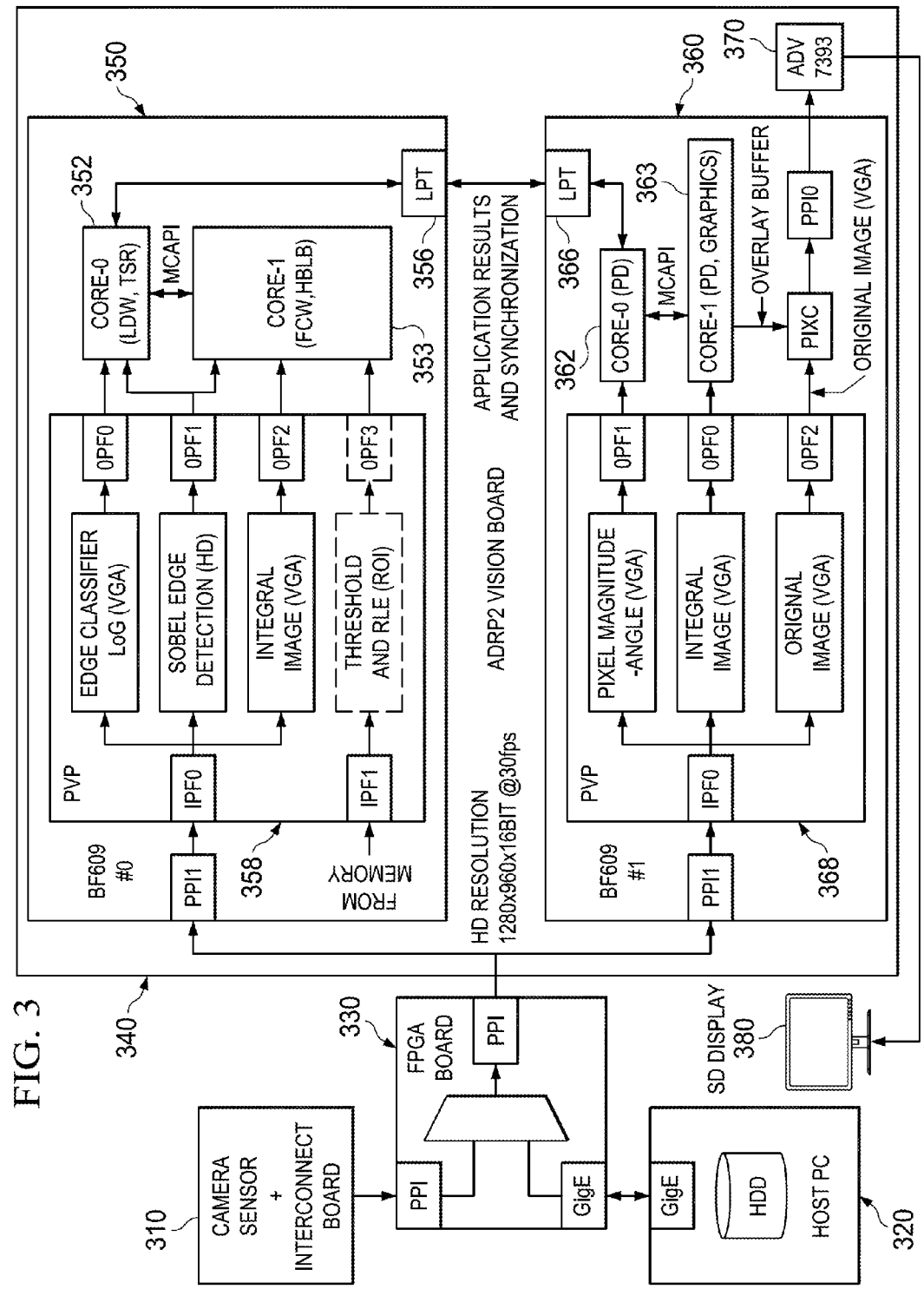
FIG. 3 is a block diagram of an example embedded computer for an advanced driver assistance system providing vehicle detection.

FIG. 3 discloses an example hardware architecture for performing the method of FIG. 1. In the example hardware architecture, a camera 310 provides a video feed. Optionally (for example, for testing purposes) a host PC 320 may also be provided. A multiplexer board 330 mediates communications between camera 310 and host PC 320 on the one hand and an embedded motherboard 340. In this example embodiment, the example motherboard 340 is an Analog Devices, Inc. ADRP2 Vision Board. Motherboard 340 carries two digital signal processors 350 and 360. In this example embodiment, DSPs 350 and 360 are both Analog Devices, Inc. Blackfin BF609 dual-core processors. Each BF609 is equipped with two processing cores as well as a pipeline vision processor (PVP), which is a species of video preprocessor 358, 368. The PVPs are configured to perform pre-processing, including in the example embodiment, Sobel edge detection and run-length encoding, as well as generating summed area tables for images. DSPs 350 and 360 may use ports 356 and 366 for application results and synchronization.

In the embodiment of FIG. 3, two DSPs are provided so that FCW can be performed on high-definition (HD) data at a resolution of 1280×960 pixels at 30 frames per second without compromising real-time performance. FCW is performed in addition to LDW, TSR, HBLB, and PD. If VGA-grade video is used instead, then processor 360 is unnecessary; a single processor can handle all five applications in that case.

In the two-processor configuration, core 0 352 of processor 0 350 performs LDW and TSR computations. Core 1 353 of processor 0 performs FCW and HBLB. In this embodiment, PD is completely handled by processor 1 360. This is because PD is the most computationally-intense task. Core 0 362 of processor 1 360 is completely dedicated to PD. Core 1 363 of processor 1 360 assists in PD and also provides output graphics subroutines for testing purposes. Processor 360 therefore also provides video output to a video processor 370, such as an Analog Devices, Inc. ADV7393, which provides a video stream to monitor 380.

Implementing such features in the above sequence provides reliable vehicle detection. The present disclosure contemplates various other sequencing schemes for the discretional cascade of relevant features. For example, the shadow detection integrated with road detection could be used for robust bottom side of the vehicle detection at an earlier stage, for example, before corner detection. In another example, the top of the vehicle could be readjusted based on the horizontal edge sum, instead of the RLE.

Figure 15:
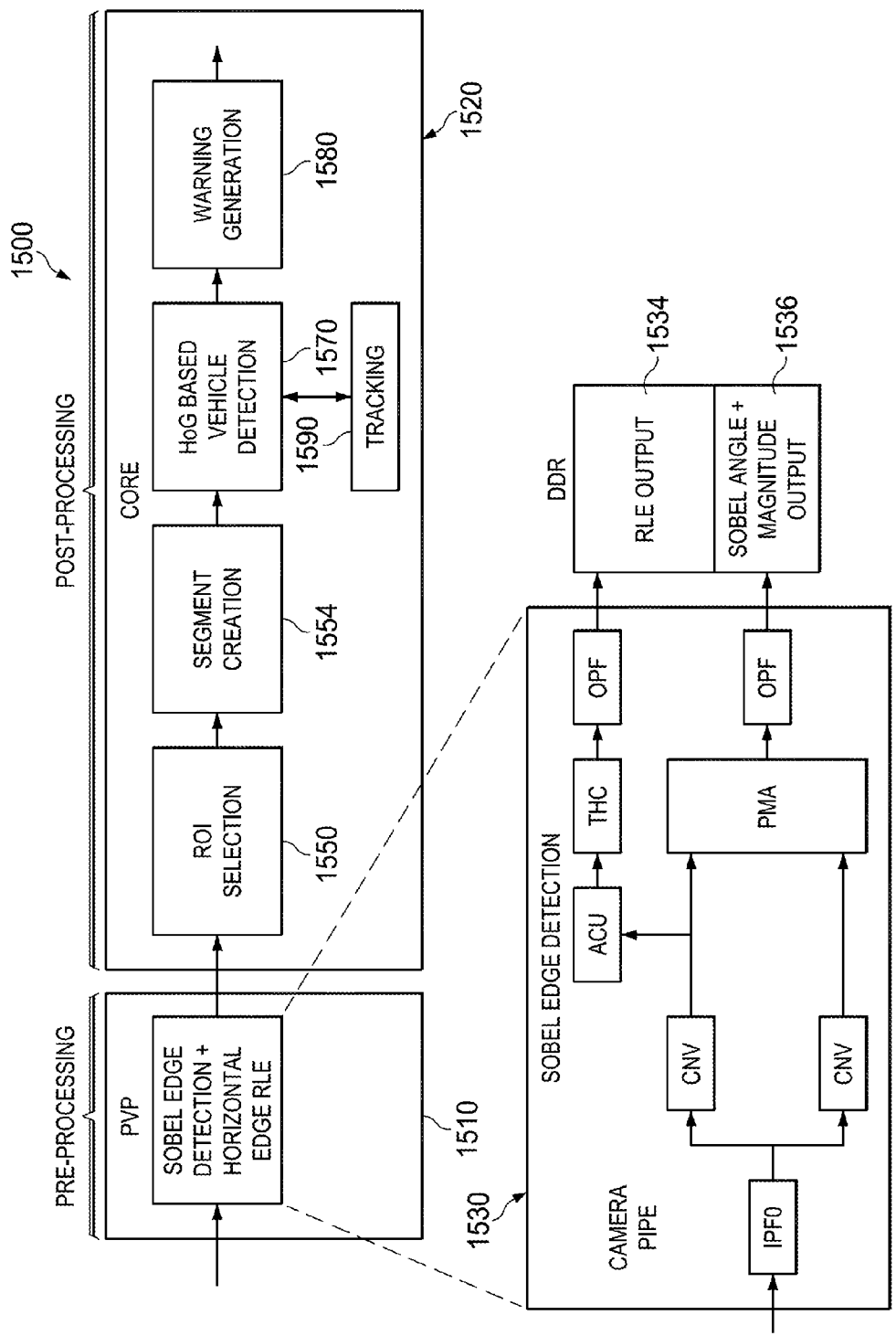
FIG. 15 is a block diagram of a further example embedded computer for an advanced driver assistance system for providing improved vehicle detection.

FIG. 15 is a block diagram of functional aspects of an object detection system 1500, including a processor carrying out a second example method using "bottom-up" detection of vertical clusters of horizontal runs. The hardware of FIG. 15 may be provided in addition to, in conjunction with, or instead of the hardware of FIG. 2. In an example, a preprocessor such as pipeline vision processor (PVP) 1510 is used for Sobel edge detection and horizontal run-length encoding calculations. In this example, PVP 1510 is provided on the Blackfin BF609 DSP. Sobel edge detection is disclosed with more particularity in block 1530, and in an example is substantially similar to the Sobel edge detection of block 230.

To calculate run lengths on the image, PVP 1510 first receives a data feed from the camera. PVP 1510 then performs a Sobel operation on the image, outputting vectors representing Sobel magnitudes and angles into Sobel output 1536. PVP 1510 also performs RLE on the image, which may be substantially similar to the RLE performed by PVP 230. The output of this function is an RLE plot 1534, which in an example is similar to RLE plot 700 (FIG. 7). PVP 1510 provides Sobel edges 1536 and RLE plot 1534 a processing core 1520, which in block 1510 selects ROIs.

Figure 16:
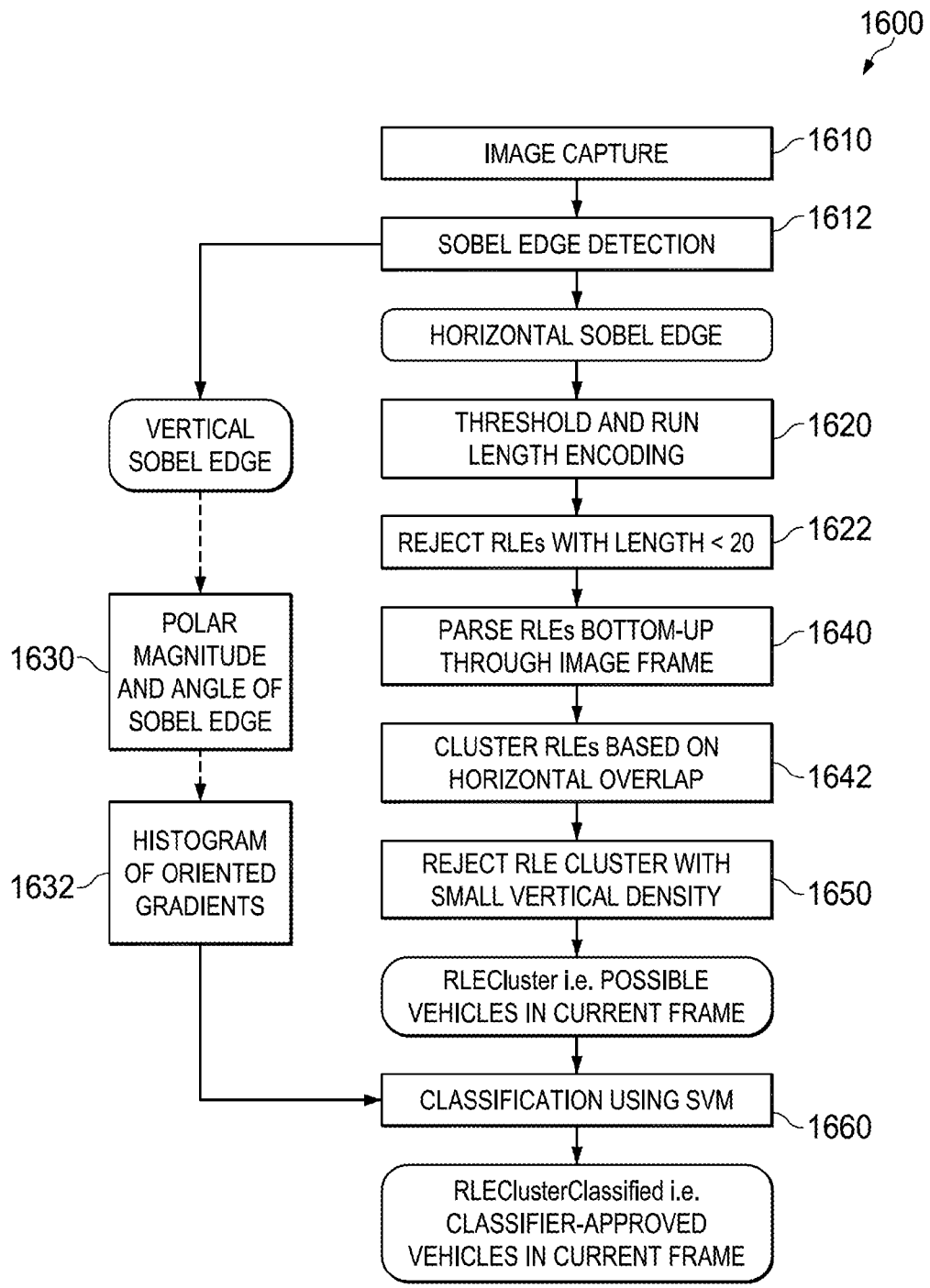
FIGS. 16 and 16A provide a flow diagram of an example method of bottom-up vehicle detection using vertical RLE clusters.

In block 1554, core 1520 divides objects of interest into segments, which in the example embodiment includes searching for vertical clusters of horizontal runs as described in FIG. 16. Candidate objects pass to block 1570 for HoG/SVM verification. Tracking is implemented in block 1590 on all objects classified as vehicles for the current frame. If the candidate object is a potential collision danger, a warning may be generated in block 1580.

Figure 16A:
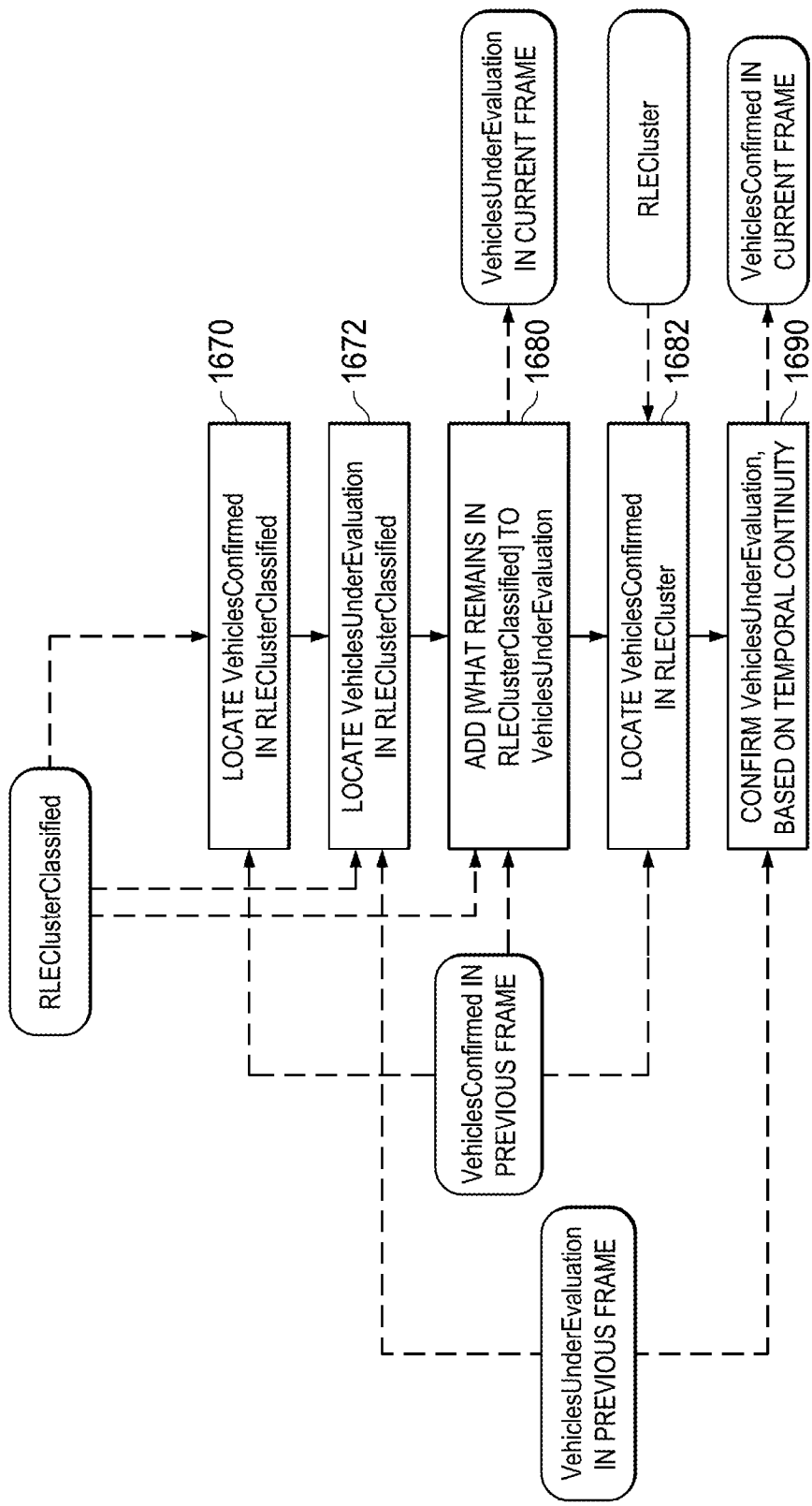

FIGS. 16 and 16A are a flow diagram of a method 1600 of performing object detection according to an example of the present specification. By way of non-limiting example, the steps of this method are disclosed in a particular order and with reference to certain example hardware disclosed herein. It should be noted, however, that the order of steps in this method are not intended to be limiting, nor is it intended that the method be confined to the specific example hardware disclosed. It should also be noted that where a first step precedes a second step, or where a second step is taken in response to a first step, there need not be a direct, causal relationship between the two steps, and it is anticipated that in some embodiments, there may be intervening steps. In block 1610, a processor such as PVP 1510 captures an image, such as one of the images disclosed in FIGS. 17-24. In block 1612, PVP 1510 performs Sobel edge detection, which is disclosed as a non-limiting example of an edge detection algorithm. This yields zero or more horizontal edges and zero or more vertical edges. In block 1630, core 1520 may calculate polar magnitude and angle of vertical edges, and use those as inputs to a histogram of oriented gradients (HoG) algorithm in block 1632. In block 1660, those may be classified using SVM, as described herein.

In block 1620, horizontal Sobel edges may be provided to PVP 1510 to perform threshold and RLE operations. The results may be provided to core 1520. In block 1622, core 1520 may reject RLEs with lengths beneath a particular threshold as being poor candidate objects. In one example, RLEs with lengths less than 20 are rejected because vehicles are expected to include continuous horizontal segments that contrast with their surroundings.

In block 1640, core 1520 may parse remaining RLE segments in a "bottom-up" fashion, meaning that runs at the "bottom" of the image are processed first. This may aid in detecting vehicles in particular because the bottom of the vehicle can be expected to contrast with the road, which maintains a relatively consistent intensity, while the top of the vehicle may become confused with other vehicles, billboards, background, and other features, which vary in intensity.

After identifying appropriate horizontal edges in block 1640, in block 1642, core 1520 may then "cluster" horizontal edges into vertical clusters or "stacks." Vertical clusters are characterized by horizontal edges with sufficient overlap on the y-axis. Vertical cluster lines may or may not have co-terminal edges. In one example, for horizontal edges to cluster, they must have a minimum common run length. For example, edges may be considered to cluster if they have at least 20 pixels sharing y-axis positions, or in other words, if they share at least 20 pixels along the x-axis, but displaced by a Δy.

In block 1650, core 1520 may reject vertical clusters with low vertical density. Vertical density may be calculated, for example, as the number of horizontal runs divided by the height of the bounding box. Low vertical density may be characteristic of features other than vehicles. The result of this operation is zero or more boxes containing vertical clusters that are candidates for vehicles. Those are provided to block 1660, which may use SVM to classify zero or more of the candidates as "classified RLE clusters in current frame."

FIG. 16A is a continuation of the flow diagram of FIG. 16. This figure describes the tracking mechanism used to confirm the classified RLE clusters as vehicles. Vehicles identified in FIG. 16 are considered "classified RLE clusters in current frame." In a moving picture, such as in an ADAS, the vehicle may have moved slightly from one frame to the next. In block 1670, the vehicles confirmed in the previous frame are located in the classified RLE clusters of the current frame, for example using Euclidean distance of corresponding corners. In block 1672, candidate vehicles from the previous frame may also be located in the classified RLE clusters of the current frame using Euclidean distance of corners. In block 1680, those classified RLE clusters that are neither the confirmed vehicles nor the candidate vehicles of previous frame are added to the set of candidate vehicles. In block 1682, the confirmed vehicles of the previous frame are located in the entire RLE cluster set (even if it was classified as a non-vehicle by HOG-SVM stages). The strategy here is that candidate vehicles are admitted to the confirmed set of vehicles only if they show temporal resilience (continuity across multiple frames); and once confirmed, they are not lightly discarded, hence the second check for confirmed vehicles among the set of all RLE clusters (classified as vehicles or otherwise).

In block 1690, the temporal continuity across multiple frames is used to confirm that the classified RLE cluster is, in fact, a vehicle. For example, if the classified RLE cluster can be successfully located in at least 4 out of 10 consecutive frames, then it is a 'confirmed' vehicle. Once confirmed, a vehicle is not lightly discarded from the list of vehicles being tracked.

Figure 17:
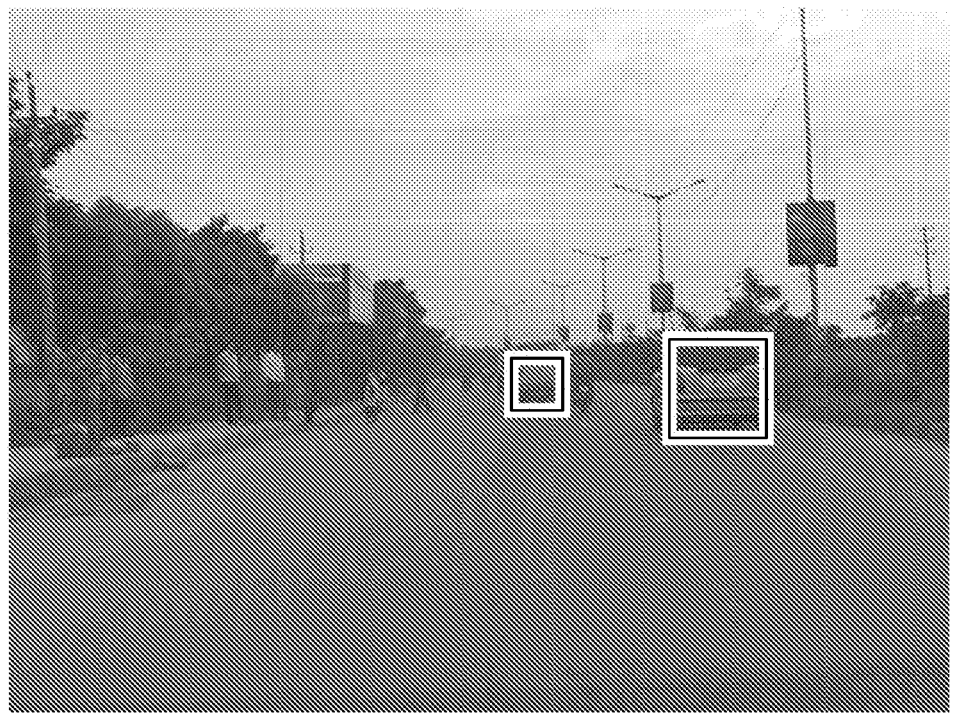
FIGS. 17-24A provide examples of vehicle candidates detected and confirmed according to an example of the method disclosed in FIGS. 16 and 16AU.
Figure 17A:
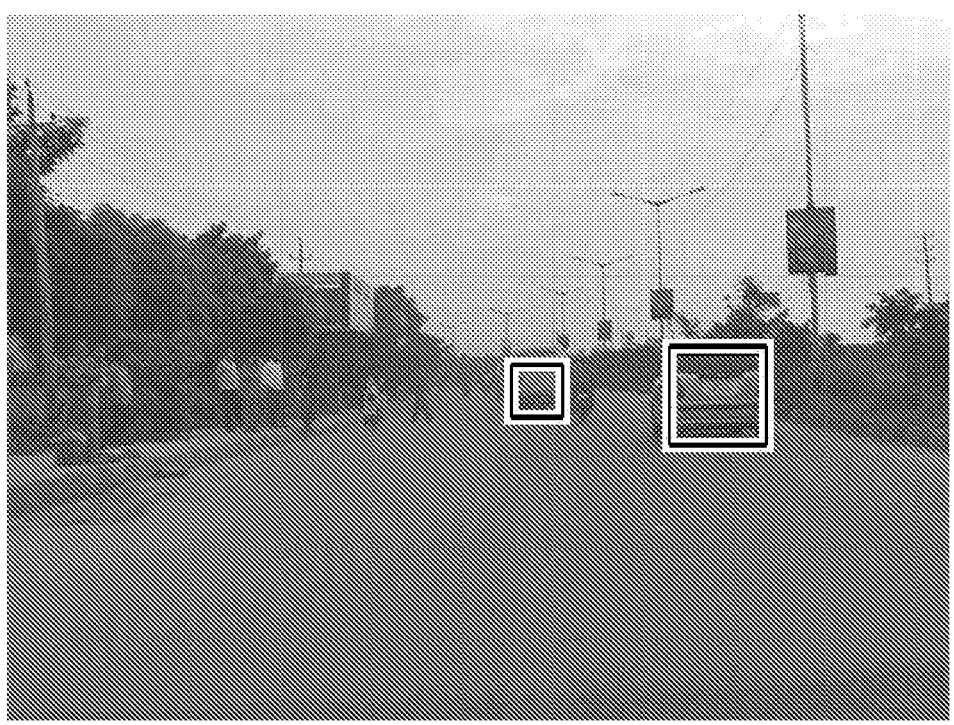

FIGS. 17-24 are examples of vehicle candidates squares, and confirmed vehicles. In each series, the first image shows RLE clusters that are identified as vehicle candidates based on vertical stacks, or RLE clusters, and after RLE clusters with low vertical density are eliminated. The second image in the series shows vehicles that are confirmed as vehicles, by SVM and histogram of gradients, coupled with the tracking mechanism of FIG. 16A. In FIG. 17, two RLE clusters are selected as vehicle candidates. In FIG. 17A, both candidates are confirmed as vehicles.

Figure 18:
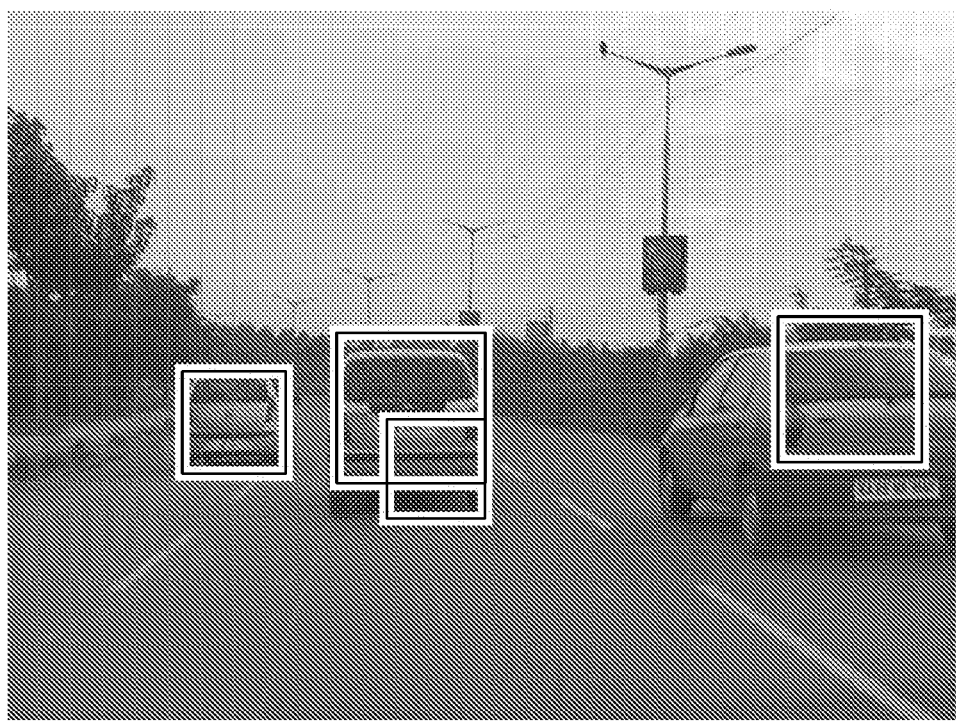
Figure 18A:
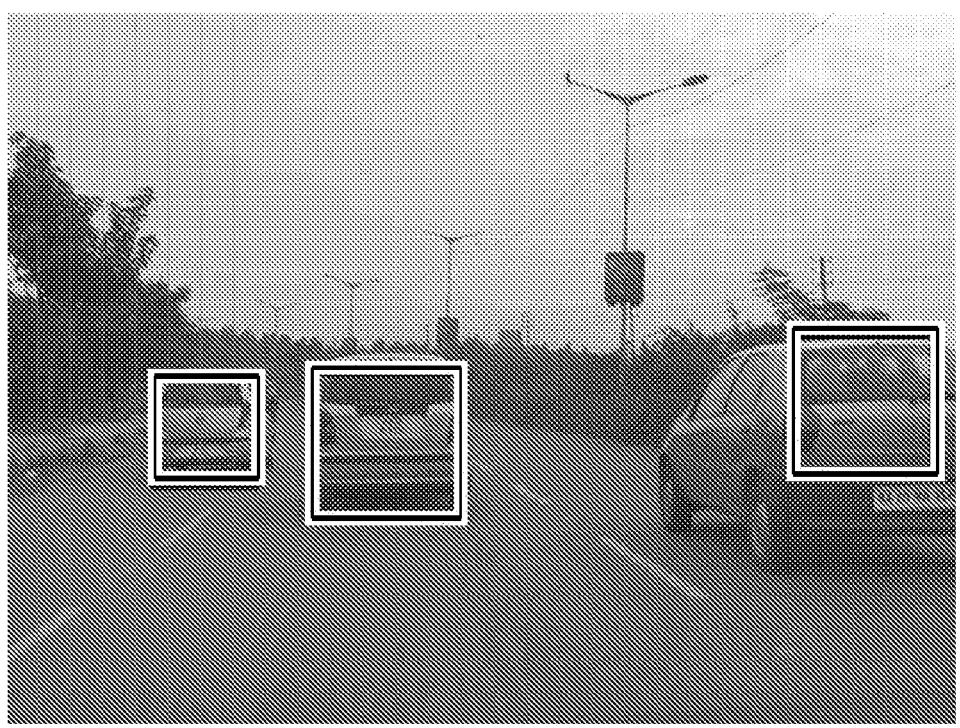

In FIG. 18, four RLE clusters are identified. One of the clusters overlaps another cluster. In FIG. 18A, it is found that the overlapping cluster is a false positive, while the other three are confirmed as vehicles.

Figure 19:
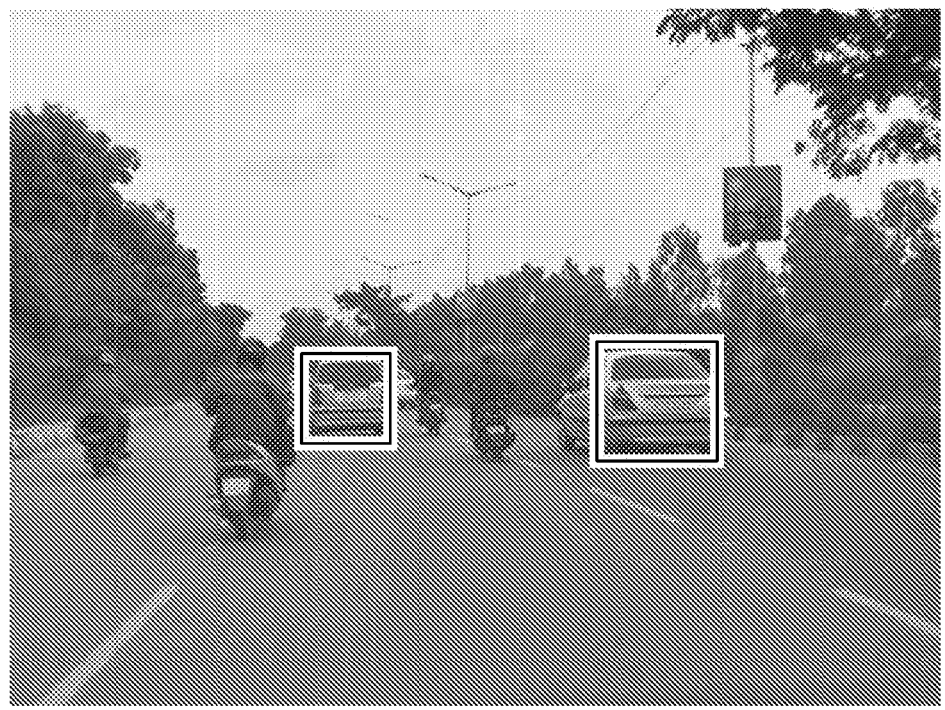
Figure 19A:
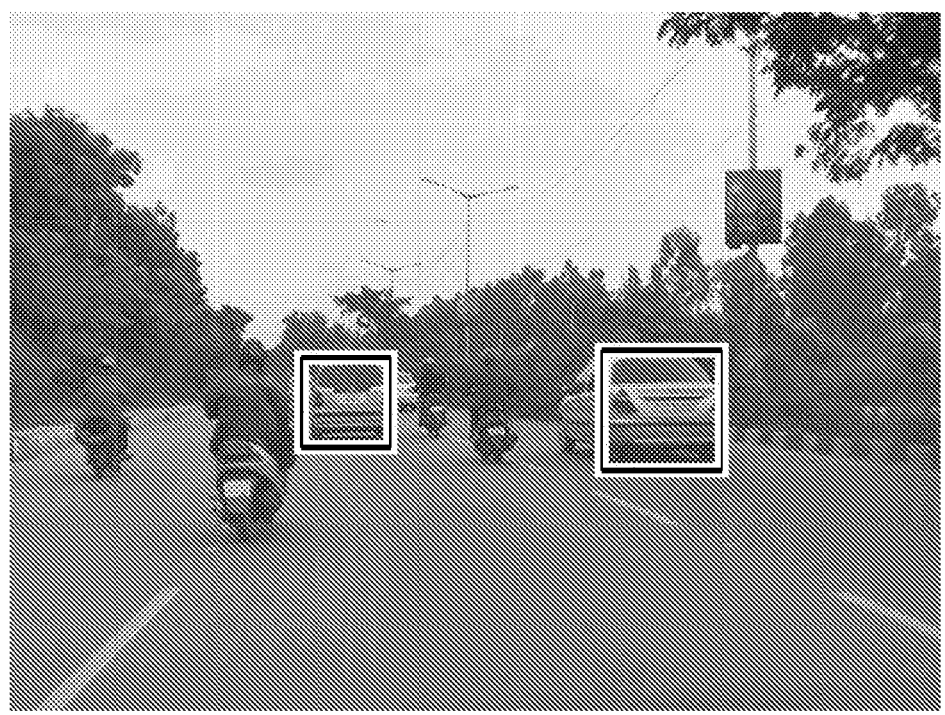

In FIG. 19, it is apparent that motorcycles and their riders do not form RLE clusters that are good vehicle candidates according to this algorithm. Thus, in an example, a different processing algorithm may be used specifically to detect motorcycles, pedestrians, and bicycles.

Figure 20:
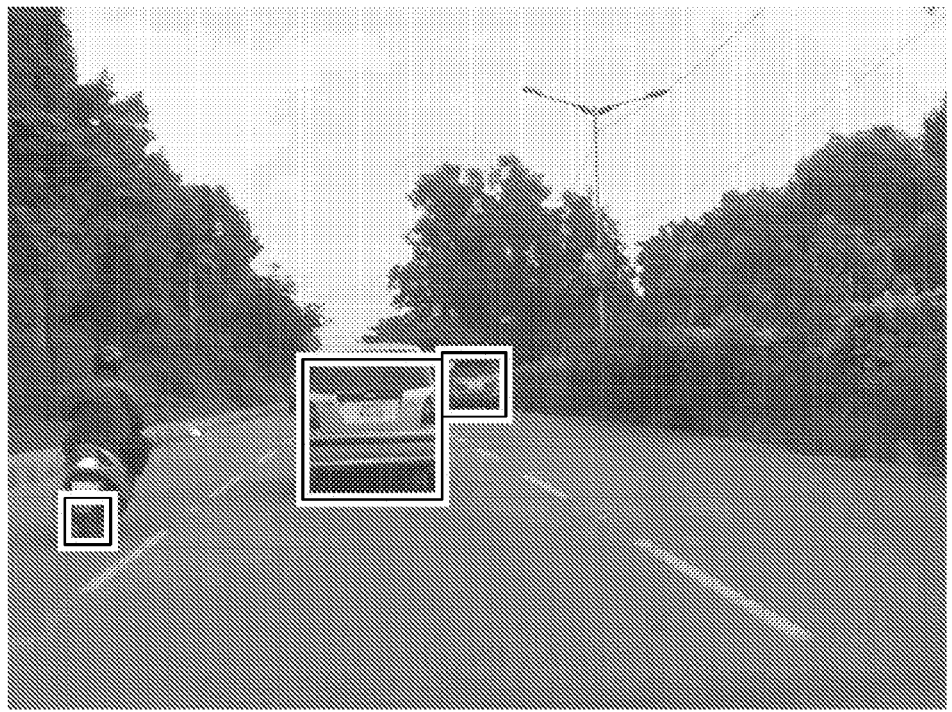
Figure 20A:
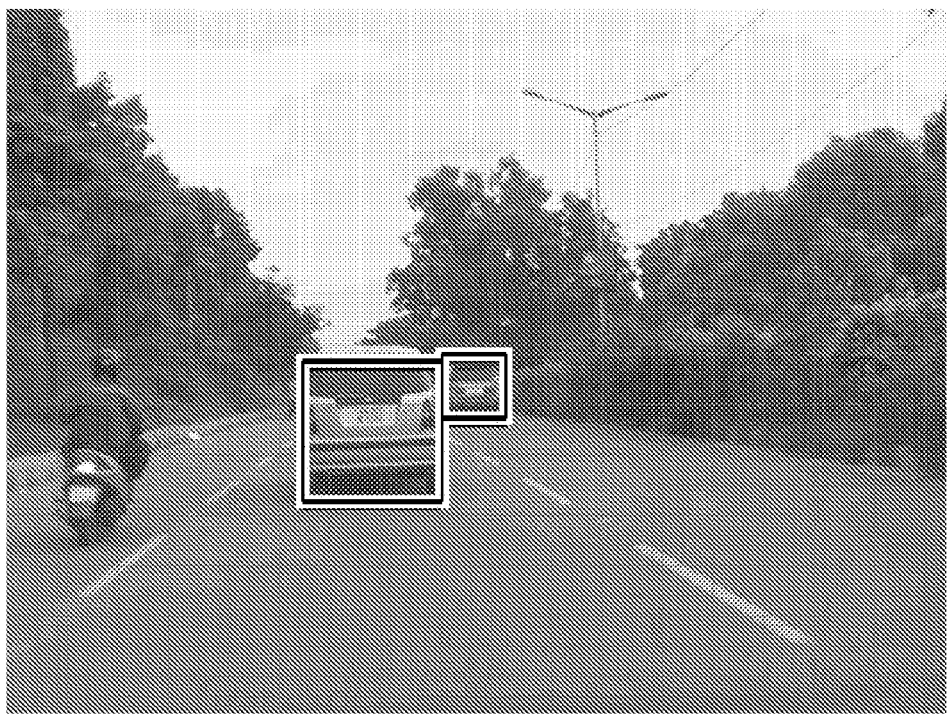

In FIG. 20, it is seen it that certain features, such as a motorcycle, may form sufficient RLE clusters to provide a false positive vehicle identification. However, in FIG. 20A, the motorcycle has been eliminated by the HOG-SVM classification step.

Figure 21:
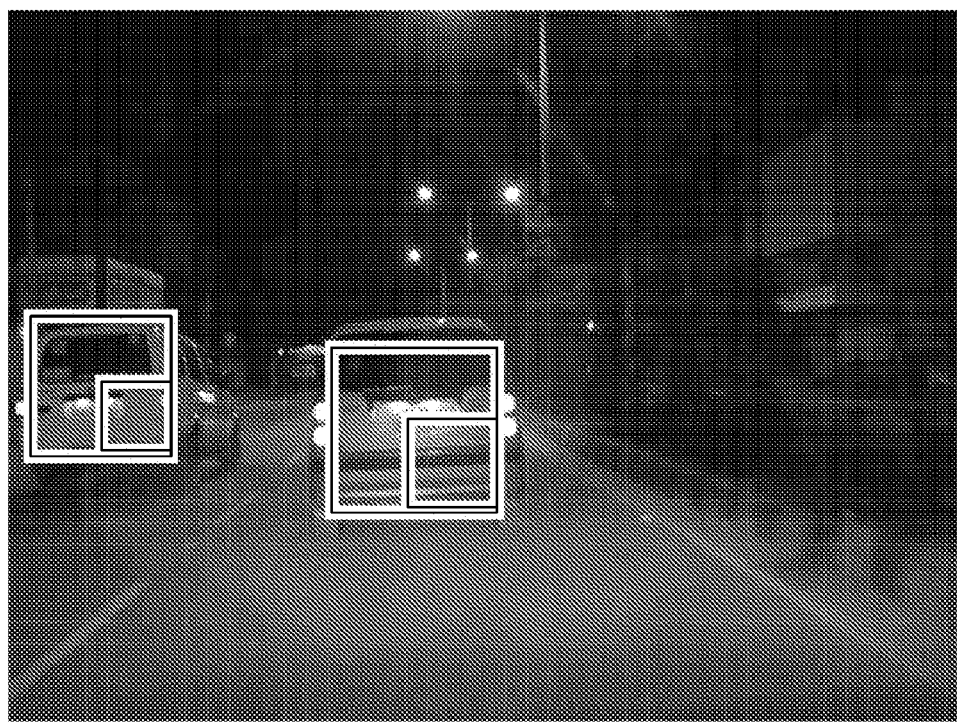
Figure 21A:
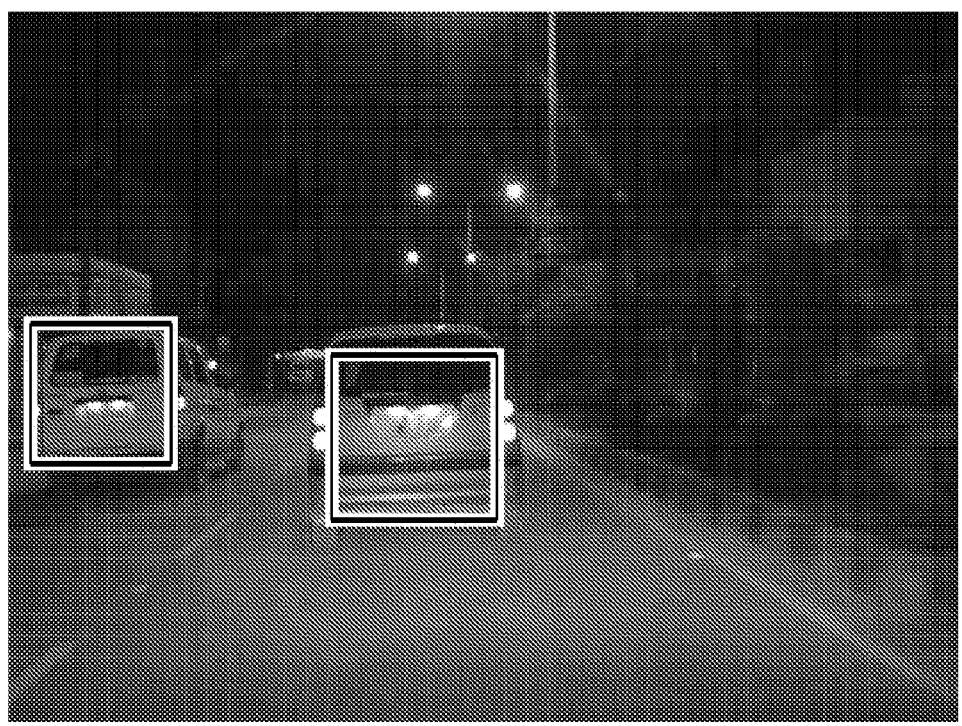

FIGS. 21 and 21A show an example of vehicle detection in a night scene. In this case, two RLE clusters are parts of actual vehicles. These are subsets of RLE clusters that enclose the actual vehicle better. In this case, the smaller clusters may be eliminated in favor of the larger RLE cluster by the classifier (SVM in this example), coupled with the tracking mechanism described in FIG. 16A.

Figure 22:
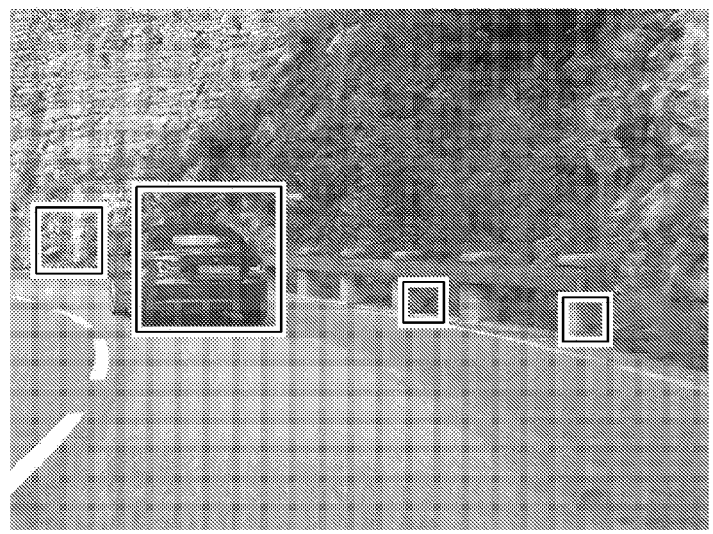
Figure 22A:
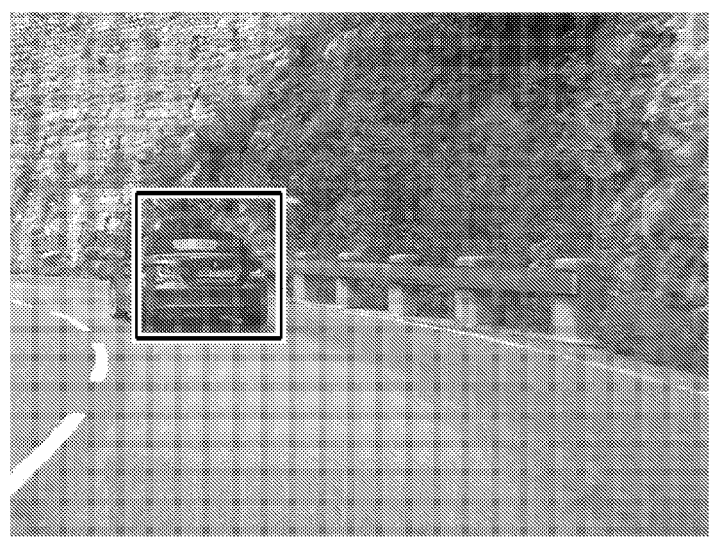

FIGS. 22 and 22A disclose an example where a background feature provides an RLE cluster with high vertical density, which provides a false positive. In this case, the false positive may pass the vertical density test, and may only be eliminated as SVM and histogram of gradients processing.

Figure 23:
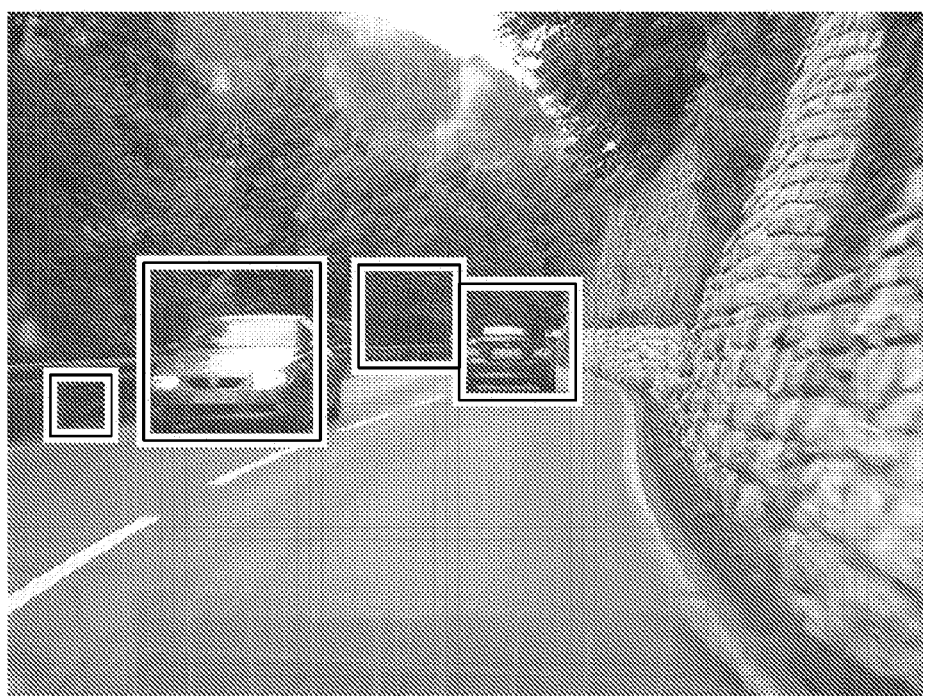
Figure 23A:
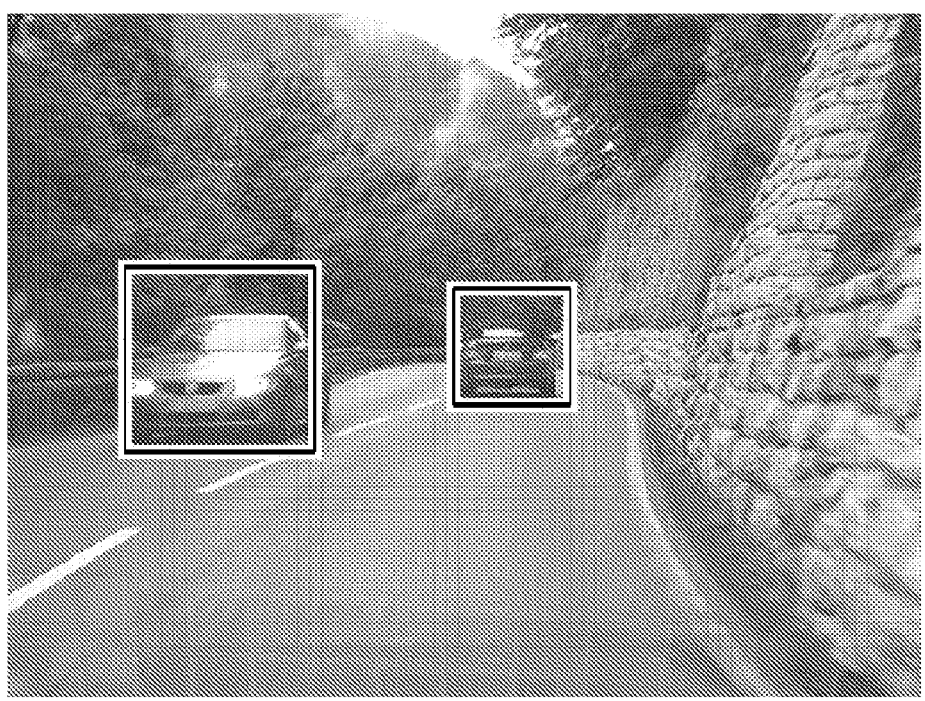

FIGS. 23 and 23A disclose an example where both leading and oncoming traffic are accurately detected. FIG. 23 also includes two false positives that may be eliminated by the classifier.

Figure 24:
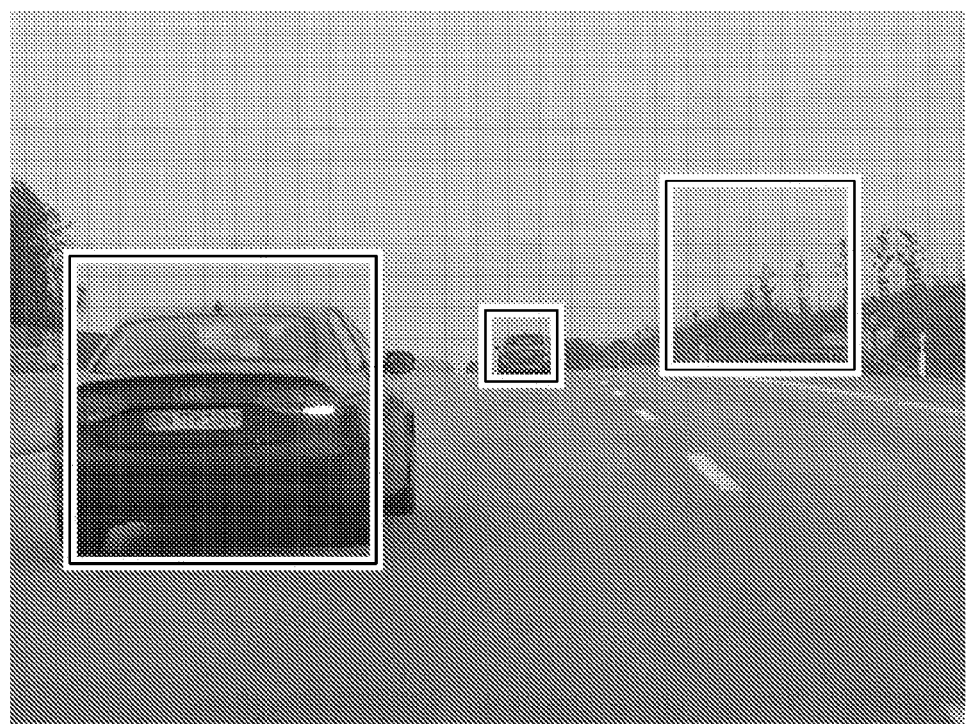
Figure 24A:
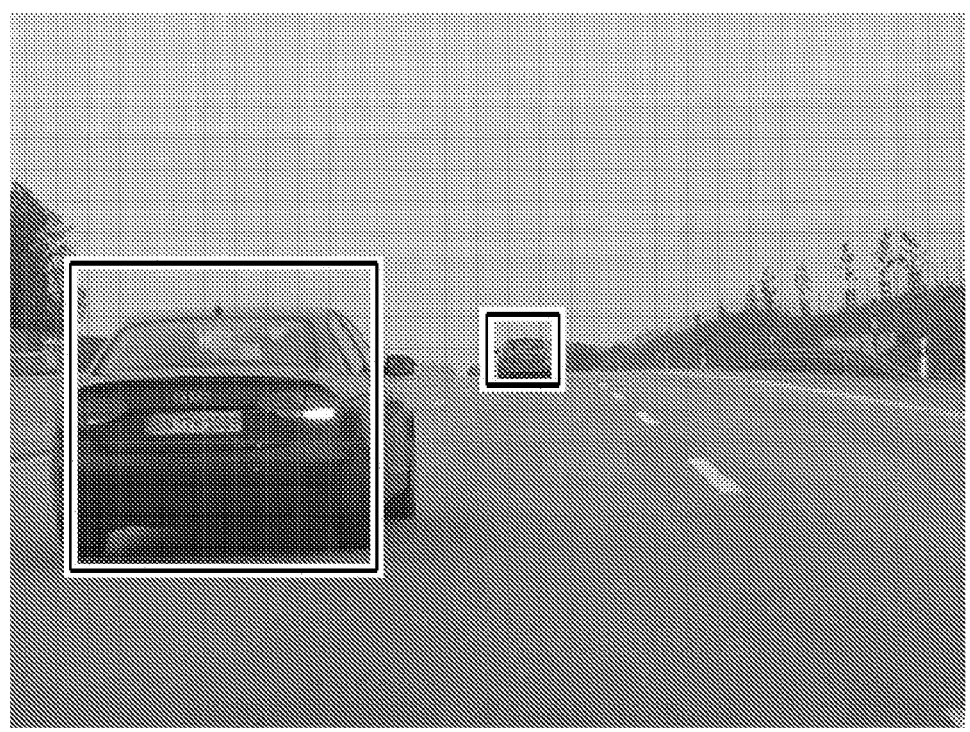

FIG. 24 discloses another example where a false positive is detected based on several RLE clusters. The false positive is removed in FIG. 24A by the classifier, coupled with the tracking logic described in FIG. 16A.

The disclosed vehicle detection method provides numerous advantages, where it is understood that different embodiments may have different advantages and no advantage is necessarily required of any embodiment.

In the discussions of the embodiments above, the capacitors, buffers, graphics elements, interconnect boards, clocks, DDRs, camera sensors, dividers, inductors, resistors, amplifiers, switches, digital core, transistors, and/or other components can readily be replaced, substituted, or otherwise modified in order to accommodate particular circuitry needs. Moreover, it should be noted that the use of complementary electronic devices, hardware, non-transitory software, etc. offer an equally viable option for implementing the teachings of the present disclosure.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself.

In another example embodiment, the electrical circuits of the FIGURES may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole.

An SOC represents an IC that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the functionalities may be implemented in one or more silicon cores in Application Specific Integrated Circuits (ASICs), Field Programmable Gate Arrays (FPGAs), and other semiconductor chips.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

The specifications, dimensions, and relationships outlined herein have only been offered for purposes of example and teaching only. Each of these may be varied considerably without departing from the spirit of the present disclosure, or the scope of the appended claims. The specifications apply only to non-limiting examples and, accordingly, they should be construed as such. In the foregoing description, example embodiments have been described with reference to particular component arrangements. Various modifications and changes may be made to such embodiments without departing from the scope of the appended claims. The description and drawings are, accordingly, to be regarded in an illustrative rather than a restrictive sense. Further, the operations and steps described with reference to the preceding FIGURES illustrate only some of the possible scenarios that may be executed by, or within, the various apparatuses, processors, devices, and/or systems, described herein. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "steps for" are specifically used in the particular claims; and (b) does not intend, by any statement in the specification, to limit this disclosure in any way that is not otherwise reflected in the appended claims.

What is claimed is:

1. A method of detecting an object of interest in an image comprising:
   receiving a first frame of the image;
   performing edge detection on the first frame of the image;
   performing run-length encoding (RLE) on detected edges of the first frame of the image to identify edges for a shape bounding a candidate object;
   generating a hypothesis that the candidate object is the object of interest comprising identifying vertical RLE clusters as part of the candidate object, and processing the vertical RLE clusters upward from a bottom by an intensity contrast; and
   confirming in a second frame of the image the hypothesis that the candidate object is the object of interest.

2. The method of claim 1, wherein generating a hypothesis comprises identifying vertical RLE clusters as vehicle candidates.

3. The method of claim 2, wherein generating a hypothesis further comprises eliminating vertical RLE clusters with low vertical density.

4. The method of claim 1, further comprising:
   calculating a distance to the object of interest; and
   providing a warning if the object of interest is closer than a threshold.

5. The method of claim 1, wherein confirming the hypothesis comprises:
   calculating a histogram of gradients for the candidate object; and
   classifying the candidate object as the object of interest using a support vector machine method.

6. The method of claim 1, further comprising comparing the object of interest to a substantially similar object of interest identified in a next frame to determine temporal continuity.

7. A tangible computer-readable storage medium having stored thereon executable instructions operable to:
   receive a first frame of an image;
   perform edge detection on the first frame of the image;
   perform run-length encoding (RLE) on detected edges to identify edges for a shape bounding a candidate object;
   generate a hypothesis that the candidate object is an object of interest comprising identifying vertical RLE clusters as part of the candidate object, and processing the vertical RLE clusters upward from a bottom by an intensity contrast; and confirm in a second frame of the image the hypothesis that the candidate object is the object of interest.

8. The medium of claim 7, wherein the instructions operable to generate a hypothesis comprise instructions operable to identify vertical RLE clusters as vehicle candidates.

9. The medium of claim 8, wherein the instructions operable to generate a hypothesis further comprises instructions operable to eliminate vertical RLE clusters with low vertical density.

10. The medium of claim 7, further comprising instructions operable to:
calculate a distance to the object of interest; and
provide a warning if the object of interest is closer than a threshold.

11. The medium of claim 7, wherein the instructions operable to confirm the hypothesis comprise instructions operable to:
calculate a histogram of gradients for the candidate object; and
classify the candidate object as the object of interest using a support vector machine method.

12. The medium of claim 7, further comprising instructions operable to compare the object of interest to a substantially similar object of interest identified in a next frame to determine temporal continuity.

13. An advanced driver assistance system (ADAS) comprising:
a camera;
a processor; and
a storage medium having stored thereon executable instructions operable to instruct the processor to:
receive a first frame of an image from the camera;
perform edge detection on the first frame of the image;
perform run-length encoding (RLE) on detected edges to identify edges for a shape bounding a candidate object;
generate a hypothesis that the candidate object is an object of interest comprising identifying vertical RLE clusters as part of the candidate object, and processing the vertical RLE clusters upward from a bottom by an intensity contrast; and
confirm in a second frame of an image the hypothesis that the candidate object is the object of interest.

14. The ADAS of claim 13, wherein the instructions operable to generate a hypothesis comprise instructions operable to identify vertical RLE clusters as vehicle candidates.

15. The ADAS of claim 14, wherein the instructions operable to generate a hypothesis further comprises instructions operable to eliminate vertical RLE clusters with low vertical density.

16. The ADAS of claim 13, further comprising instructions operable to:
calculate a distance to the object of interest; and
provide a warning if the object of interest is closer than a threshold.

17. The ADAS of claim 13, wherein the instructions operable to confirm the hypothesis comprise instructions operable to:
calculate a histogram of gradients for the candidate object; and
classify the candidate object as the object of interest using a support vector machine method.

18. The ADAS of claim 13, further comprising instructions operable to compare the object of interest to a substantially similar object of interest identified in a next frame to determine temporal continuity.

* * * * *